United States Patent
Witte et al.

(10) Patent No.: US 9,132,756 B1
(45) Date of Patent: Sep. 15, 2015

(54) HEAD RESTRAINT ASSEMBLIES

(71) Applicants: John Witte, Lowell, MI (US); Robert R. Sutter, Rockford, MI (US)

(72) Inventors: John Witte, Lowell, MI (US); Robert R. Sutter, Rockford, MI (US)

(73) Assignee: GILL INDUSTRIES, INC., Grand Rapids, MI (US)

(*) Notice: Subject to any disclaimer, the term of this patent is extended or adjusted under 35 U.S.C. 154(b) by 0 days.

(21) Appl. No.: 14/205,706

(22) Filed: Mar. 12, 2014

Related U.S. Application Data

(60) Provisional application No. 61/783,392, filed on Mar. 14, 2013.

(51) Int. Cl.
  *A47C 7/38* (2006.01)
  *B60N 2/48* (2006.01)

(52) U.S. Cl.
  CPC ............ *B60N 2/4852* (2013.01); *B60N 2/4838* (2013.01)

(58) Field of Classification Search
  USPC ........................................................ 297/408
  See application file for complete search history.

(56) References Cited

U.S. PATENT DOCUMENTS

| | | | | |
|---|---|---|---|---|
| 4,674,792 A | * | 6/1987 | Tamura et al. | 297/408 |
| 4,674,797 A | * | 6/1987 | Tateyama | 297/408 |
| 4,678,232 A | * | 7/1987 | Ishida et al. | 297/408 |
| 5,642,918 A | * | 7/1997 | Sakamoto et al. | 297/408 |
| 5,964,505 A | * | 10/1999 | Koenig et al. | 297/408 |
| 6,045,181 A | * | 4/2000 | Ikeda et al. | 297/408 X |
| 6,802,562 B1 | * | 10/2004 | Hake et al. | 297/408 X |
| 8,662,592 B2 | * | 3/2014 | Keller et al. | 297/408 X |
| 8,936,310 B2 | * | 1/2015 | Takayama et al. | 297/408 X |
| 8,979,203 B1 | * | 3/2015 | Sutter et al. | 297/408 |
| 2004/0108766 A1 | * | 6/2004 | Baker et al. | 297/408 |
| 2011/0175421 A1 | * | 7/2011 | Grable | 297/408 |
| 2014/0339875 A1 | * | 11/2014 | Sunaga et al. | 297/408 |

* cited by examiner

*Primary Examiner* — Rodney B White
(74) *Attorney, Agent, or Firm* — Dickinson Wright PLLC

(57) ABSTRACT

A head restraint assembly, comprising: a support configured to mount the head restraint above a seat back; a bun assembly pivotally mounted on the head restraint support for movement in first and second directions relative to the head restraint support, the limit of the first and second directions of movement defining fully forward and fully upright positions, respectively, of the bun assembly; and an adjustment mechanism disposed at least substantially within the bun assembly, the adjustment mechanism configured to permit the pivotal movement of the bun assembly in either of the first and second directions.

9 Claims, 27 Drawing Sheets

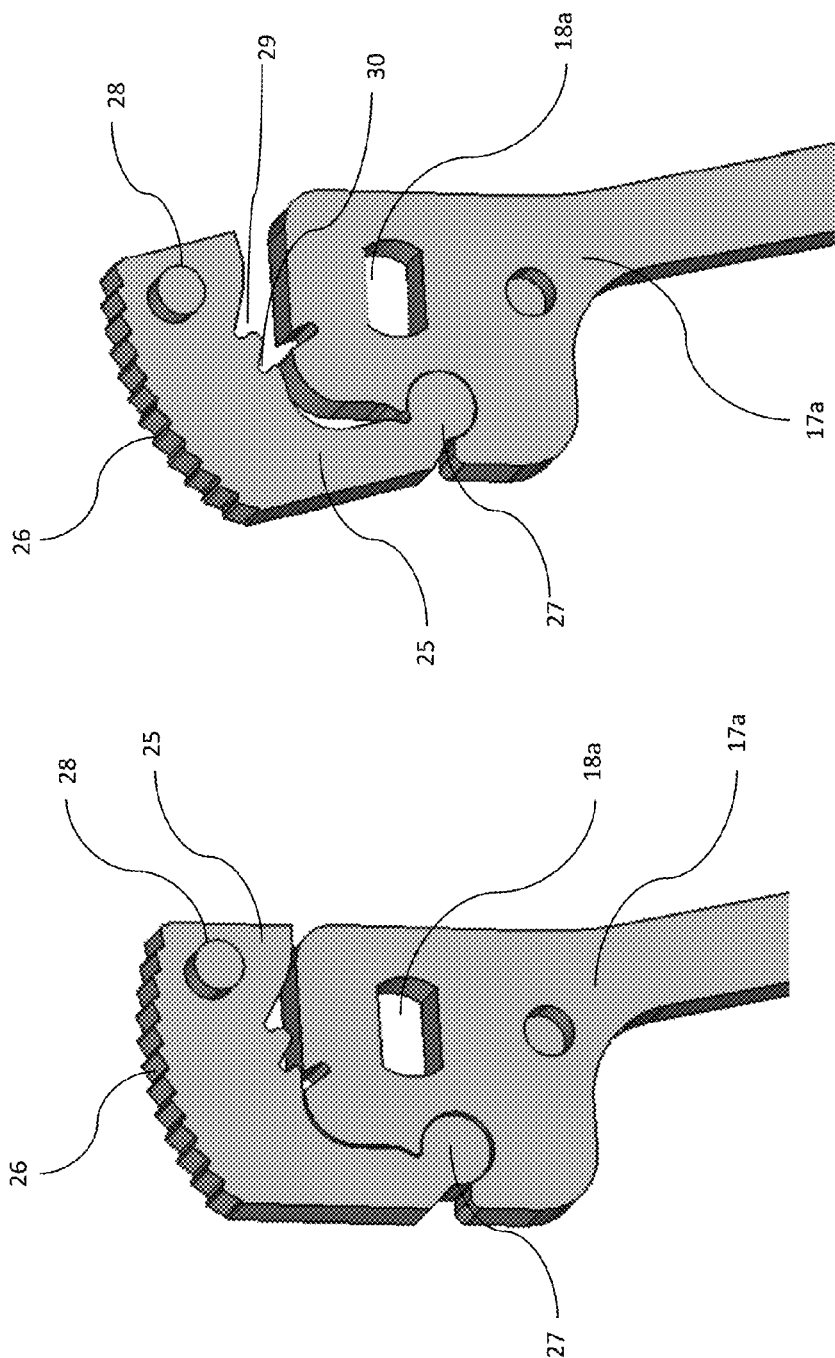

HEAD RESTRAINT ASSEMBLIES

CROSS-REFERENCE TO RELATED APPLICATIONS

The present application relates to, and claims the benefit of priority from, U.S. Provisional Application Ser. No. 61/783,392, filed 14 Mar. 2013, the disclosure of which application is incorporated herein by reference in its entirety.

FIELD OF THE INVENTION

The present invention relates to head restraint assemblies, such as, for instance, are employed in vehicles, and, more particularly, to foldable head restraints.

BACKGROUND

Head restraint assemblies, which generally comprise a headrest component—commonly called a bun—adjustably supported on the top of a seat-back, protect a vehicle occupant from serious injury due to sudden acceleration or deceleration of the vehicle. In one typical form thereof, head restraints are adjustable relative to the seat-back both vertically as well as forwardly and rearwardly in order to permit their proper positioning for the occupant. Forward and rearward adjustment is typically accomplished with a ratchet-style mechanism which, upon occupant actuation of a release means (such as, for instance, a button or lever), releases the ratchet mechanism to permit the head restraint to move under spring bias to a full-forward position. From this position, the head restraint can be moved rearwardly into one of a plurality of intermediate positions, each defined by the ratchet mechanism. Because of this construction, it is possible for the ratchet mechanism to be inadvertently released, such as in the event of a rear impact, and moved forward to a position that may enhance the risk of occupant injury.

SUMMARY

Disclosed herein are head restraint assemblies including a support configured to mount the head restraint above a seat back; a bun assembly pivotally mounted on the head restraint support for movement in first and second directions relative to the head restraint support, the limit of the first and second directions of movement defining fully forward and fully upright positions, respectively, of the bun assembly; and an adjustment mechanism disposed at least substantially within the bun assembly, the adjustment mechanism configured to permit the pivotal movement of the bun assembly in either of the first and second directions.

In one embodiment, the bun assembly comprises a frame assembly, and the adjustment mechanism comprises a fixed toothed member disposed on the frame assembly and a toothed pawl member. The fixed tooth member includes a plurality of teeth arranged to define a plurality of predefined positions of the bun assembly along the path of travel in the first and second directions thereof. The toothed pawl member is moveable between an engaged position, in which the teeth of the pawl member are engaged with the teeth of the fixed tooth member, and a disengaged position, in which the teeth of the pawl member are disengaged from the teeth of the fixed tooth member. In the condition where the bun assembly is moved in the second direction to the fully upright position thereof when the toothed pawl member is in the disengaged position thereof, the bun assembly may, per one feature, contact the toothed pawl member to urge the toothed pawl member into the engaged position.

Per another feature, the toothed pawl member is a monolithic element including a pivot portion received within an interface of the head restraint support. The toothed pawl member and interface are shaped so that the toothed pawl member is moveable about the pivot portion between the engaged and disengaged positions.

According to another feature, the adjustment mechanism includes a biasing element. When the toothed pawl member is in the engaged position, the biasing element provides a biasing force that keeps the toothed pawl member in the engaged position; and when the toothed pawl member is in the disengaged position, the biasing element provides a biasing force that keeps the toothed pawl member in the disengaged position. Alternatively, the adjustment mechanism includes a biasing element providing a biasing force that keeps the toothed pawl member in the engaged position, and a manually-operative actuator configured to overcome the biasing force of the biasing element and move the toothed pawl member from the engaged position into the disengaged position so long as the actuator is actuated.

Per a still further feature, the adjustment mechanism further comprises a manually-operative actuator configured to move the toothed pawl member from the engaged position into the disengaged position.

According to yet another feature, the bun assembly is biased to the fully upright position.

According to another embodiment, the adjustment mechanism comprises a pawl member disposed on the frame assembly and a ratchet member. The pawl member includes a plurality of teeth arranged to define a plurality of predefined positions of the bun assembly along the path of travel in the first and second directions thereof. The ratchet member is disposed on the frame assembly and is moveable between an engaged position, in which the teeth of the ratchet member are engaged with the teeth of the pawl member, and a disengaged position, in which the teeth of the ratchet member are disengaged from the teeth of the pawl member.

According to one feature of this embodiment, the adjustment mechanism comprises a manually-operative actuator configured to move the ratchet member between the engaged and disengaged positions thereof upon actuation of the actuator. The actuator may comprise, per one feature, a cam member rotatable between locked and unlocked positions upon manual operation of the actuator. The cam member in moving to the unlocked position thereof moves the ratchet member to the disengaged position thereof; and the cam member in moving to the locked position thereof moves the ratchet member to the engaged position thereof.

According to a still further embodiment, the adjustment mechanism comprises a stationary toothed component fixed in place relative to the support, and a ratchet member. The stationary toothed component includes a plurality of teeth arranged to define a plurality of predefined positions of the bun assembly along the path of travel in the first and second directions thereof. The ratchet member is disposed on the frame assembly, and is moveable between an engaged position, in which the teeth of the ratchet member are engaged with the teeth of the pawl member, and a disengaged position, in which the teeth of the ratchet member are disengaged from the teeth of the pawl member. A manually-operative actuator includes a cam member rotatable between locked and unlocked positions upon manual operation of the actuator, the cam member in moving to the unlocked position thereof moves the ratchet member to the disengaged position thereof, and the cam member in moving to the locked position thereof moves the ratchet member to the engaged position thereof.

BRIEF DESCRIPTION OF THE DRAWINGS

The foregoing and other features and advantages of the present invention may be better understood with reference to the specification and accompanying drawings, of which:

FIGS. 6A and 6B are detailed lateral views of the pawl member and interface portions of the head restraint assembly of FIG. 1, shown in isolation from the rest of the assembly, with the pawl member shown in an engaged position in FIG. 6B, and a disengaged position in FIG. 6A;

DETAILED DESCRIPTION

Figure 1:
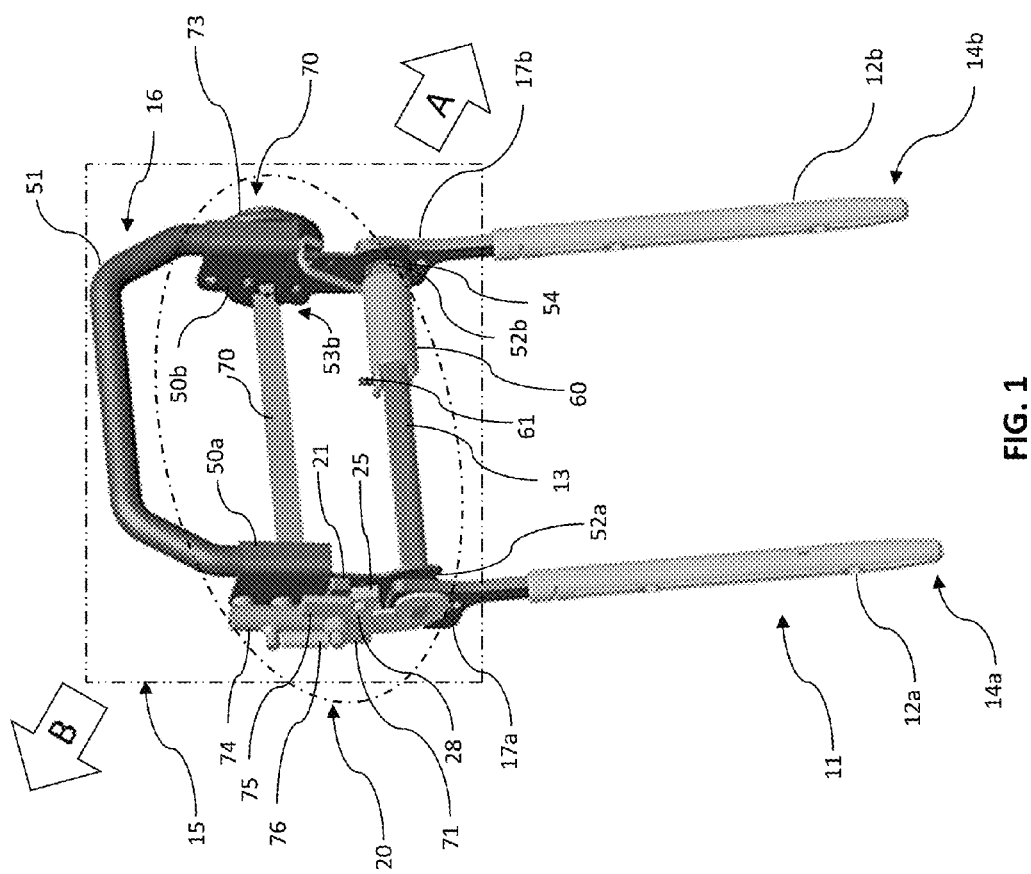
FIG. 1 depicts the present invention according to a first embodiment.
Figure 2:
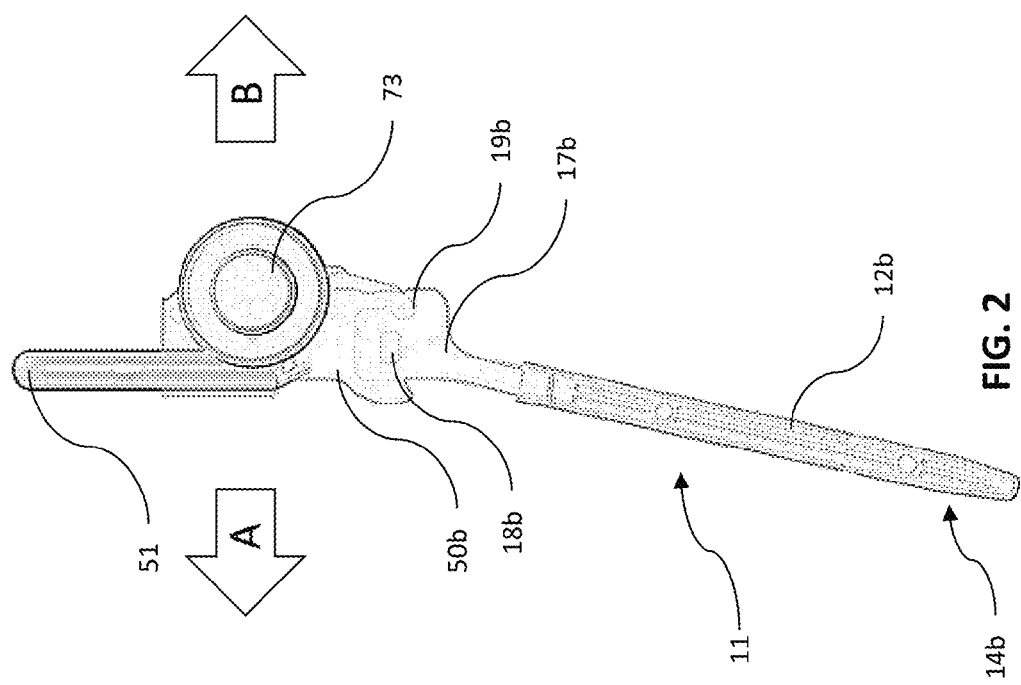
FIG. 2 is lateral view of the head restraint assembly of FIG. 1.

Referring to FIGS. 1 through 10, wherein like numerals indicate like or corresponding parts throughout the several views, the present invention may be seen to comprise, according to a first exemplary embodiment, a head restraint assembly comprising a support (indicated generally at 11 in FIG. 1) for mounting the head restraint above a seat back; a bun assembly (indicated generally at 15 in FIG. 1 within the dashed square area) pivotally mounted on the head restraint support for movement in first, forward A, and second, rearward B directions relative to the head restraint support 11; and an adjustment mechanism (indicated generally in the encircled area 20 of FIG. 1) disposed at least substantially within the bun assembly 15. The adjustment mechanism 20 is configured to permit the selective pivotal movement of the bun assembly 15 in either of the first A and second B directions and, as the bun assembly 15 is moved in either of the first, forward A and second, rearward B directions, the incremental positioning of the bun assembly 15 in any of a plurality of predefined positions along the path of travel of the bun assembly 15 in the first A and second B directions.

While the following exemplary embodiments of the invention are described in the specific operational environment of a head restraint assembly for a vehicle, such as an automobile, it will be appreciated that the present invention may be adapted to other seating systems as well.

Head restraint support 11 may comprise, as shown by way of example and not limitation, a pair of spaced-apart vertical supports 12a, 12b connected by a horizontally-disposed support 13. Each vertical support 12a, 12b terminates at an interface 17a and 17b, respectively. Each interface 17a, 17b forms, according to the illustrated embodiment, a monolithic element defining a slot 18a, 18b for receiving the horizontal support 13, a semi-circular socket 19a, 19b for receiving a pivot 27, and a notch 23 for engaging one end of a C-spring 40 (see, e.g., FIGS. 7A, 7B, 12 and 13).

Each interface 17a, 17b may be fixed to its respective vertical support 12a, 12b by an overmold process, by being coined into the vertical support 12a or 12b (see, e.g., FIG. 12), by rivets (see, e.g., FIG. 13), or, if the interface 17a, 17b and the vertical support 12a, 12b are made of the same or complimentary materials, by welding (not shown).

Per convention, the free, lower ends 14a, 14b of the vertical supports 12a, 12b are received in head restraint guides (not depicted) provided in the top of the vehicle seat back (not shown). The vertical supports 12a, 12b, horizontal support 13 and interfaces 17a, 17b may be made of metal, polymer, polymer-coated metal or other materials suitable to the purpose. Of course, the head restraint support 11 may be comprised of fewer or more supports and interfaces, and of different configurations, than those depicted (12a, 12b, 13, 17a, 17b) in the exemplary embodiment.

As shown in FIG. 1, the bun assembly 15 is, according to the first exemplary embodiment, comprised of a conventional plastic core structure (not shown) in which is disposed a frame assembly (shown generally at 16) and an adjustment mechanism (shown generally at 20). Alternatively, in place of the core structure may be substituted, also per convention, a molded foam (such as expanded polypropylene, or EPP) component which is secured (such as by adhesives, for instance) to the crossbar 51.

As will be appreciated by those skilled in the art, the bun assembly 15 further comprises a cover (not depicted) of fabric or other material, which cover is disposed over a core structure (not shown) with a suitable padding material (e.g. foam) (not depicted) disposed in between.

Of course, those skilled in the art will appreciate that the foregoing bun assembly 15 is exemplary only, and that modifications thereto are possible which would accommodate and permit the operation of the adjustment mechanism 20 as herein described, as well as variations thereof.

Still referring to FIG. 1, the frame assembly 16 more particularly comprises a first bracket member 50a and a second bracket member 50b interconnected by a structurally reinforcing crossbar 51.

Figure 3:
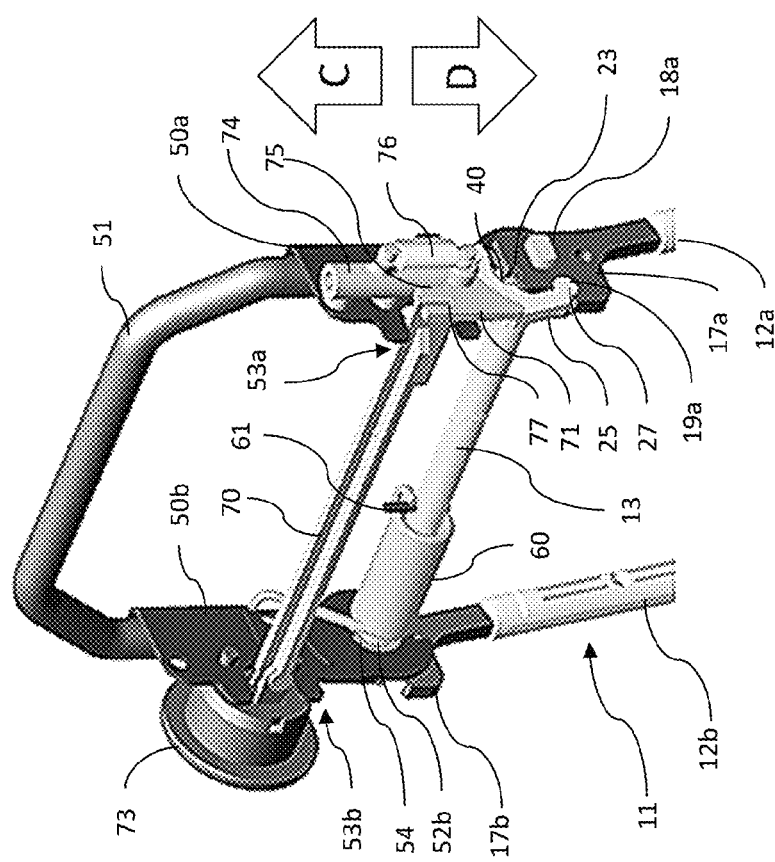
FIG. 3 is a quartering perspective of the head restraint assembly of FIG. 1.

As shown best in FIG. 3, first and second bracket members 50a, 50b may be seen to each comprise, according to the illustrated embodiment, a monolithic element defining a circular opening 52a, 52b the inner diameter of which is shaped to conform to the outer diameter of the horizontal support 13. A bushing 54 may be installed between the circular openings 52a, 52b and the horizontal support 13. Each bracket member 50a, 50b is pivotally mounted substantially on either end of the horizontal support 13 to permit selective movement of the head restraint assembly in the manner hereafter described. Each of the first and second bracket members 50a, 50b and cross-bar 51 may be fashioned from metal, a suitable polymer, polymer coated metal, or other materials suitable to the purpose.

A first torsion spring 60 is disposed about the horizontal support 13 and acts upon a pin 61 and the second bracket member 50b to provide a biasing force against the frame assembly 16 toward the second, rearward direction B.

Of course the frame assembly 16 may be comprised of more cross-bars, and/or of cross-bars of different configurations, than depicted in the exemplary embodiment. Further, it is contemplated that the first torsion spring 60 could be positioned such that it acts upon the first bracket member 50a, rather than the second bracket member 50b, as shown. Additionally, those skilled in the art will recognize that a torsion spring may be included to act on each bracket member present.

In the embodiment of FIGS. 1 through 10, the adjustment mechanism 20 may be seen to more particularly comprise a plurality of stationary teeth 22 defined on a stationary toothed member 21 attached to first bracket member 50a, the stationary teeth 22 defining a plurality of predefined positions along the path of travel of the bun assembly 15 in the first, forward A, and second, rearward B directions (see FIGS. 4 through 8A, and 10). A toothed pawl member 25 is rotatably moveable about the axis of pivot 27 between a first, engaged position (shown in FIGS. 4 and 7B) in which the teeth 26 of the pawl member 25 are engaged with the stationary teeth 22, and a second, disengaged position (shown in FIGS. 5, 7A, 8A and 8B), in which the teeth 26 of the pawl member 25 are disengaged from the stationary teeth 22.

As shown best in FIGS. 1, 4, 5, 8A and 9, the stationary toothed member 21 is fixed to the first bracket member 50a such that the stationary teeth 22, defined on the stationary toothed member 21 (see, e.g., FIGS. 4, 5, and 7A through 8B for the best view of stationary teeth 22), face toward the support 11. In this position, the stationary teeth 22 define the plurality of predefined positions for the bun assembly 15, as explained more fully below. The toothed member 21 may be fixed to the first bracket member 50a with a suitably strong adhesive, secured via rivets, or by welding. Alternatively, toothed member 21 and first bracket member 50a may be press fit together using pins secured through each member, the pins serving also to carry the load applied to the toothed member 21.

Turning to FIGS. 3 through 10 more specifically, the adjustment mechanism 20 includes a toothed pawl member 25, as noted above. According to the illustrated embodiment, pawl member 25 comprises a monolithic element defining a pivot 27 shaped to conform to the semi-circular sockets 19a, 19b. As shown, pivot 27 of pawl member 25 is inserted inside the socket 19a of interface 17a. By this construction, pawl member 25 is able to rotate about the axis of pivot 27 between a first, engaged position, in which the teeth 26 of the pawl member 25 are engaged with the stationary teeth 22 of the stationary toothed member 21 (see, e.g., FIGS. 4 and 7B), and a second, disengaged position, in which the teeth 26 of the pawl member 25 are disengaged from the stationary teeth 22 (see, e.g., FIGS. 5, 7A, 8A and 8B).

Of course, those skilled in the art will recognize that although the illustrations depict pawl member 25 paired with interface 17a, pawl member 25 alternatively may be paired with interface 17b. Further, the adjustment mechanism 20 may include a pawl member 25 on each of the interfaces included in the bun assembly 15.

The pawl member 25 further includes a knockout 28. The knockout 28 extends outward away from the surface of the pawl member 25 and is useful as an engagement point by which the pawl member 25 can be acted upon to move the pawl member 25 from the first, engaged position to the second, disengaged position, as will be explained more fully below.

Referring still to FIGS. 4 through 7B, and 10, the pawl member 25 also includes a first cut-out 29 shaped to engage an end of the C-spring 40. Thus one end of the C-spring 40 is engaged by the first cut-out 29 of the pawl member 25, and the other end of the C-spring 40 is engaged by the notch 23 of the interface 17a to which the pawl member 25 is paired.

The first cut-out 29 may be positioned in the pawl member 25 such that, when the pawl member 25 is in the first, engaged position (see, e.g., FIGS. 4 and 7B), the C-spring 40 provides a biasing force that keeps the teeth 26 of the pawl member 25 engaged with the stationary teeth 22. However, when the pawl member 25 is rotated to the second, disengaged position (see, e.g., FIGS. 5, 7A, 8A and 8B), the C-spring 40 moves "over center" and thus provides a biasing force that keeps the teeth 26 of the pawl member 25 disengaged from the stationary teeth 22. Thus, once the pawl member 25 is moved to the second, disengaged position, the bun assembly 15 may be freely moved until the bun assembly 15 is in the second, rearward direction B to the fully upright position (shown in FIG. 1), at which point the a projection on link member 71 contacts the pawl member 25 so as to urge it back to the first, engaged position.

Figure 4:
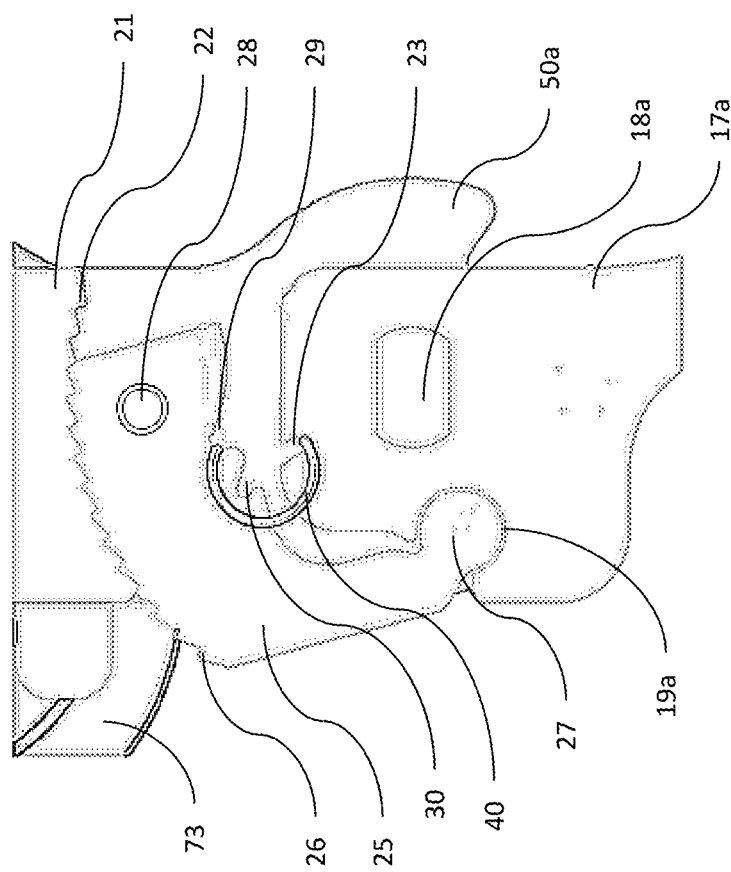
FIG. 4 is a detailed lateral view of the head restraint assembly of FIG. 1, with the pawl member shown in the engaged position thereof.
Figure 5:
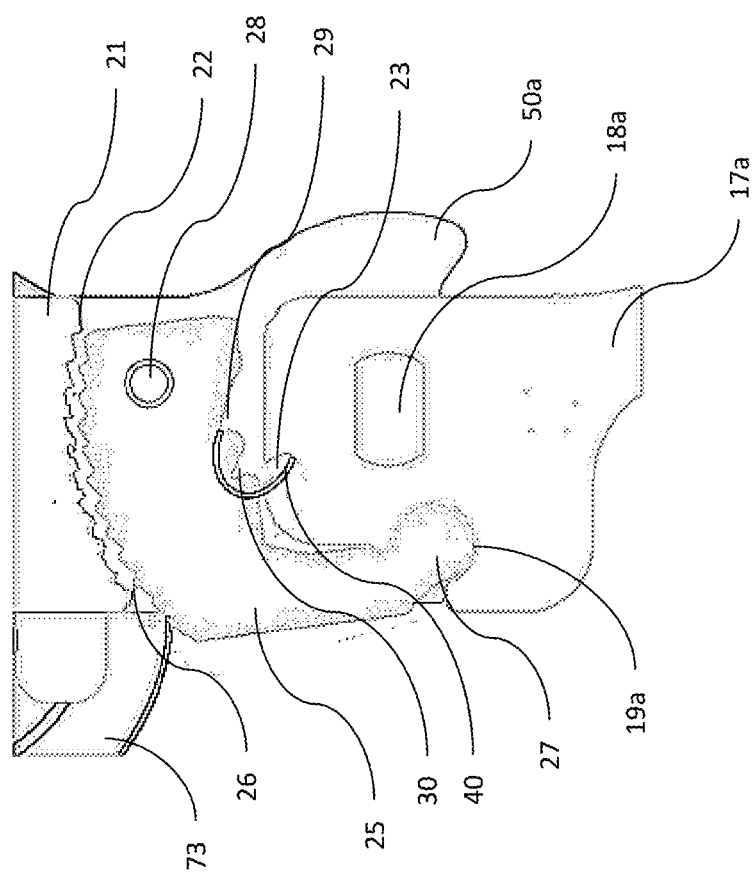
FIG. 5 is a detailed lateral view of the head restraint assembly of FIG. 1, with the pawl member shown in the disengaged position thereof.
Figure 7B:
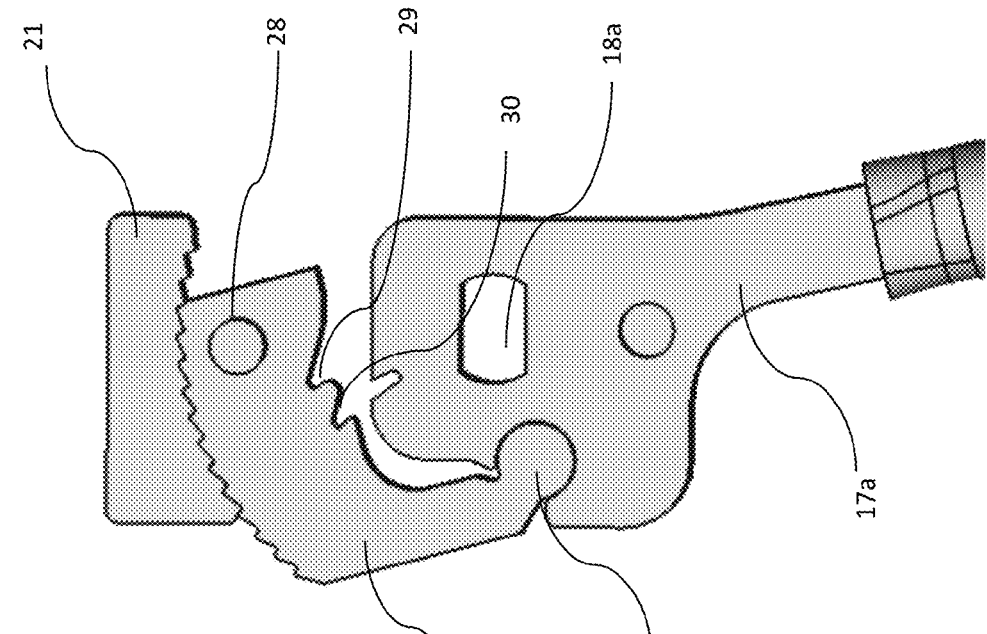
FIGS. 7A and 7B are detailed lateral views of the pawl member, toothed member, and interface portions of the head restraint assembly of FIG. 1, shown in isolation from the rest of the assembly, with the pawl member shown in an engaged position in FIG. 7B, and a disengaged position in FIG. 7A.
Figure 7A:
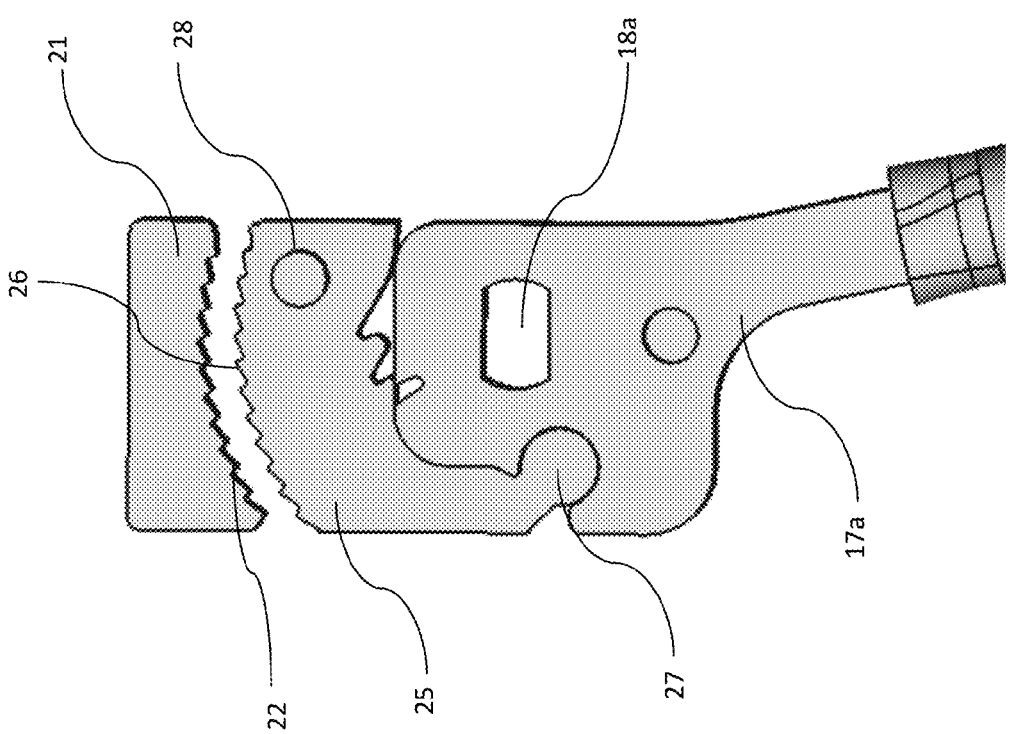
Figures 8A, 8B:
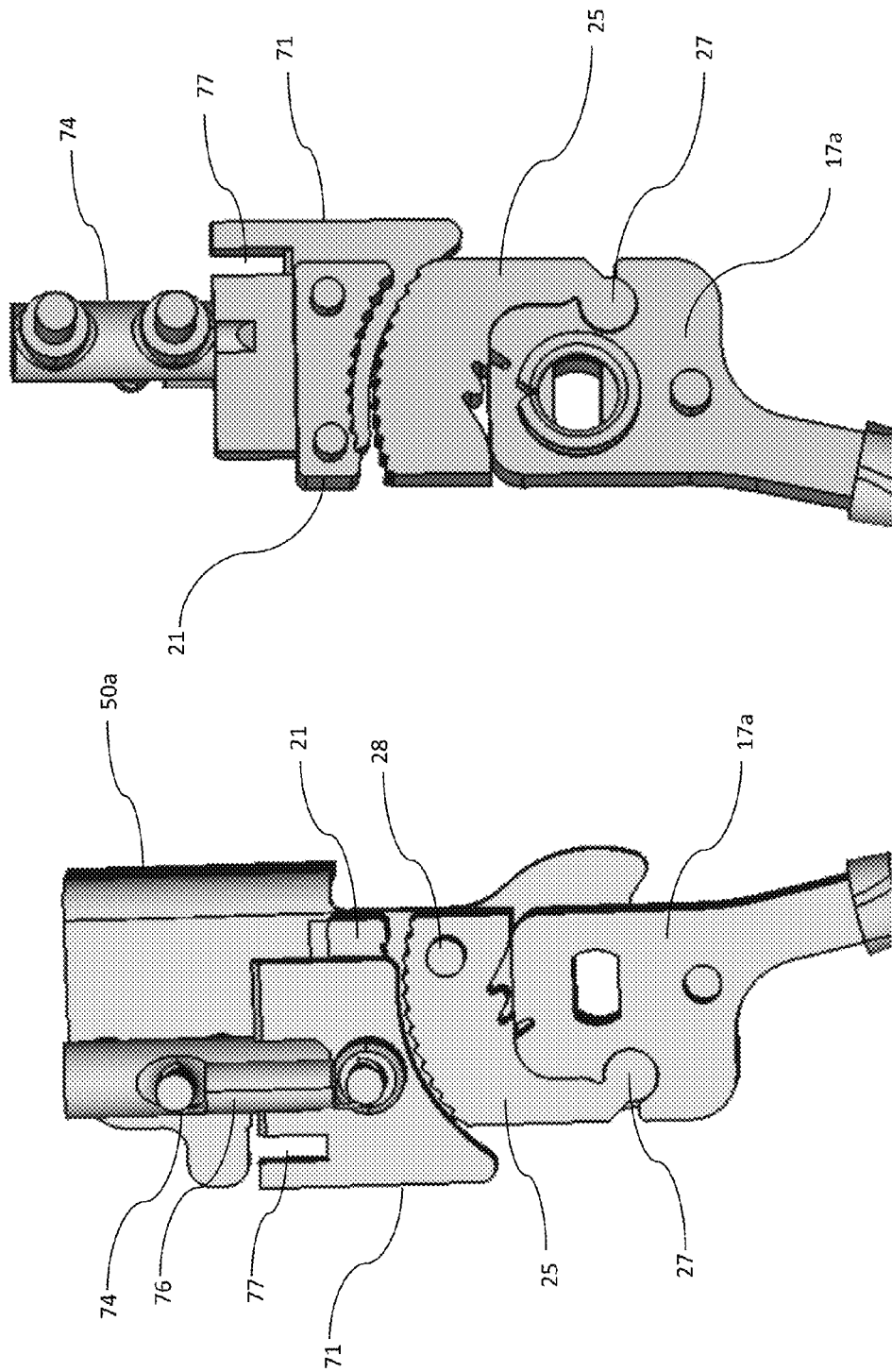
FIGS. 8A and 8B are detailed lateral views, taken from opposite perspectives, of the pawl member, toothed member, link member, and interface portions of the head restraint assembly of FIG. 1, with the bracket member shown removed in FIG. 8B for clarity.

Referring now to FIGS. 1, 3, and 8A through 10, the adjustment mechanism 20 further includes an actuator rod 70, operable by a user, such as the vehicle occupant, to move a link member 71 between a first, retracted C position (shown in FIG. 8A) and a second, extended D position (shown in FIG. 4). Actuator rod 70 is, as shown, reciprocally moveably received through openings (shown generally at 53a and 53b)

in each bracket member 50a, 50b. A first end of the actuator rod 70 includes a "button" 73 that is accessible to the user through an opening (not shown) in the bun assembly 15. "Button" 73 is, by way of example and without limitation, dimensioned to be pushed by a user's finger.

Figure 9:
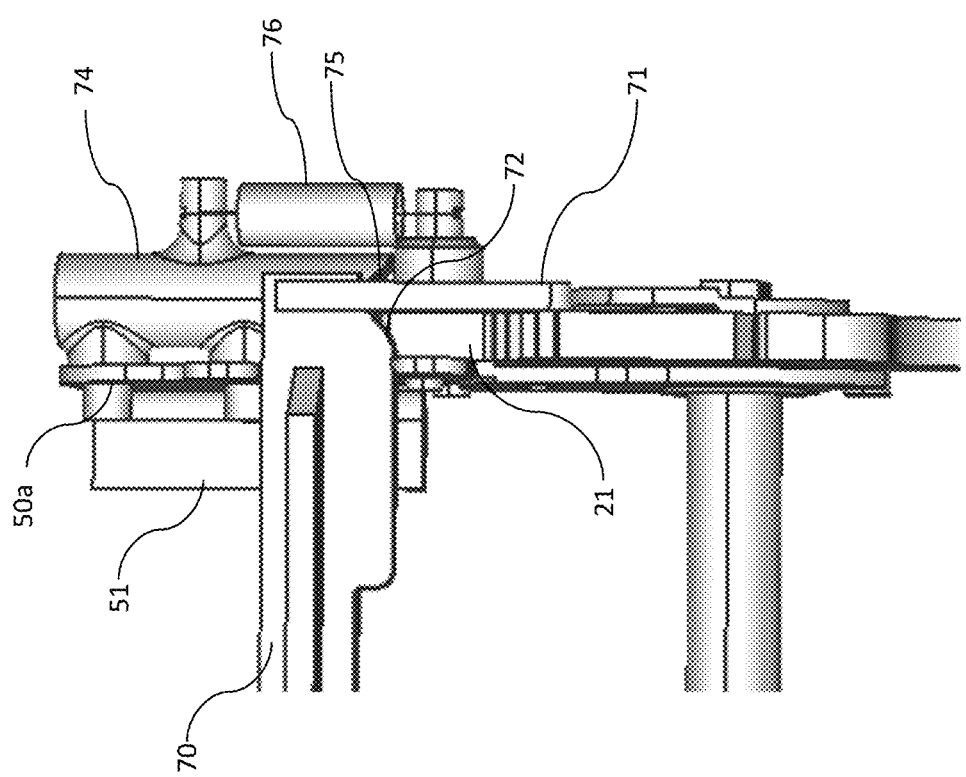
FIG. 9 is a detailed rear view of the head restraint assembly of FIG. 1, with the pawl member shown in the engaged position thereof.
Figure 10:
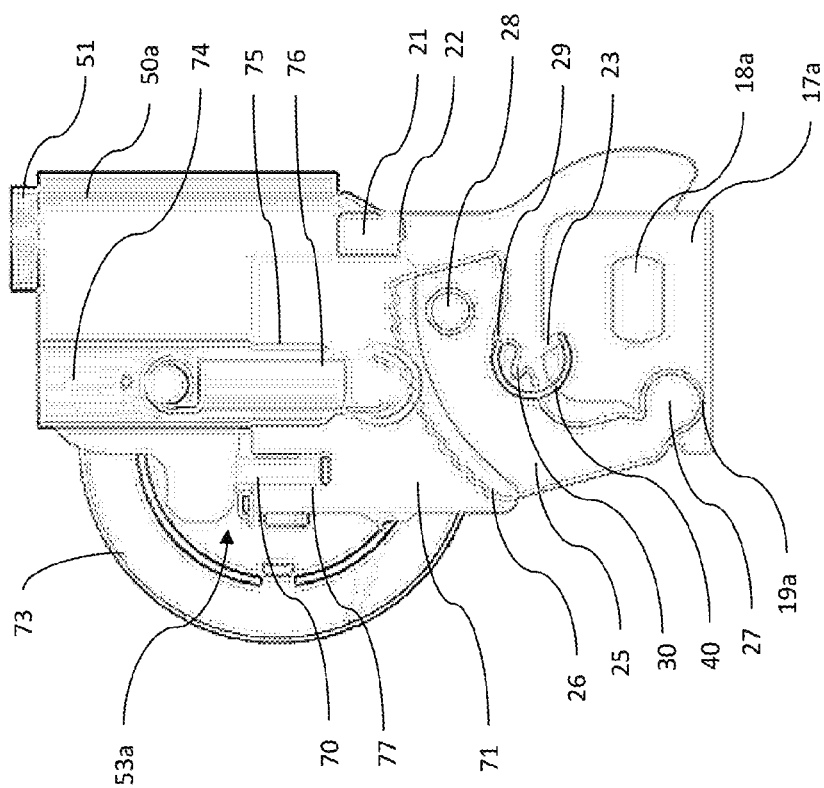
FIG. 10 is a detailed lateral view of the head restraint assembly of FIG. 1.

With continuing reference to FIGS. 3 and 9, a guide 74 is fixed to the bracket member 50a on which the stationary toothed member 21 is attached. The guide 74 contains a guide notch 75 that is shaped to fit over the link member 71 such that the link member 71 can slidably, reciprocally move within the guide notch 75 between a first, retracted position C and a second, extended position D. A tension spring 76 is attached to the guide 74 and the link member 71 such that under resting conditions the link member 71 is retained in the first, retracted position C in the guide notch 75.

The link member 71 includes a link notch 77. The link notch 77 is shaped to receive a second end of the actuator rod 70. As best shown in FIG. 9, the second end of the actuator rod 70 includes a cam surface 72 that co-acts with an inner surface of the link notch 77. See also FIGS. 8A and 8B. In the final assembly, the link member 71 is positioned such that the stationary toothed member 21 and the pawl member 25 are between the link member 71 and the first bracket member 50a (see, e.g., FIGS. 3 and 9 through 11).

Referring specifically to FIGS. 1 through 10, the head restraint assembly according to the above-described embodiment works as follows in operation: The user may move the bun assembly 15 toward the first, forward A direction stopping at any of the plurality of predefined positions along the path of travel of the bun assembly 15 by virtue of the stationary teeth 22 sliding past the teeth 26 of the pawl member 25. When a user wishes to move the bun assembly 15 in to the second, rearward B direction to the fully upright position, the user depresses the "button" 73 of the actuator rod 70. This action drives the actuator rod 70 inwardly. In response to this inward movement, cam surface 72 acts against the complimentary inner surface of link notch 77 to drive the link member 71, against the biasing force of tension spring 76, toward the second, extended position D. The link member 71 then abuts the knockout 28 and drives the pawl member 25 from the first, engaged position to the second, disengaged position. As the pawl member 25 is driven toward the second, disengaged position, the C-spring 40 passes "over center" and subsequently provides a biasing force that keeps the pawl member 25 disengaged from the stationary teeth 22 of the stationary toothed member 21 without the user having to continue to depress the "button" 73 of the actuator rod 70. The pawl member 25 then remains in this disengaged state until the first torsion spring 60 drives the bun assembly 15 fully to the second, rearward B position, at which point the a projection on link member 71 contacts the pawl member 25 so as to urge it back to the first, engaged position. From here, the user may again begin to move the bun assembly 15 in the first, forward A direction to any desired position of the plurality of predefined positions along the path of travel of the bun assembly 15.

It is contemplated that the actuator rod 70, link member 71, and guide 74 may be other than as described herein. More specifically, those skilled in the art will appreciate, with the benefit of this disclosure, that the actuator rod 70, link member 71, and guide 74 may be modified as required, such as in response to design constraints, etc., subject only to the requirement of ultimately effecting movement of the pawl member 25.

Further, it should be understood that the button 73 and actuator rod 70 may, in the alternative, be positioned on the same bracket member 50a on which the stationary toothed member 21 and link member 71 are disposed, subject only to slight modification in the described designs (including, of course, shortening the actuator rod 70).

Finally, it is contemplated that the foregoing embodiment of the invention may include a variant in which no button 73, actuator rod 70 or link member 71 are included. Rather, it is contemplated that such a variant of the first embodiment may include a knock-out or other projection on the toothed member 21 or bracket member 50a that is positioned so as to urge the pawl member 25 into the disengaged state when the headrest is at or near the limit of movement in the first, forward direction A.

Figure 11:
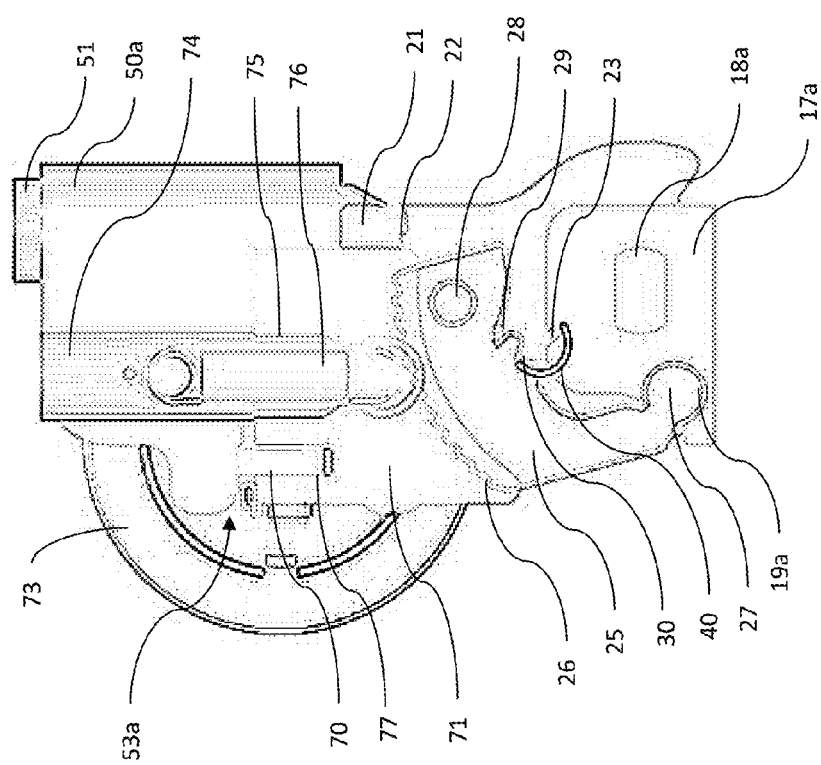
FIG. 11 is a detailed lateral view of the head restraint assembly of FIG. 1, with the C-spring shown in an alternative position.
Figure 12:
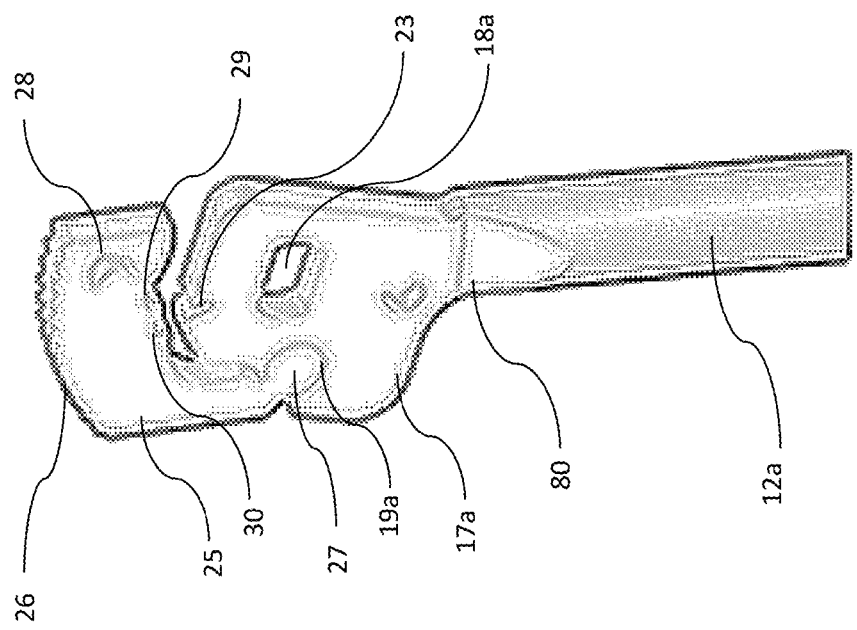
FIG. 12 is a detailed perspective view of the interface and pawl member of the head restraint assembly according to one variant form thereof.
Figure 13:
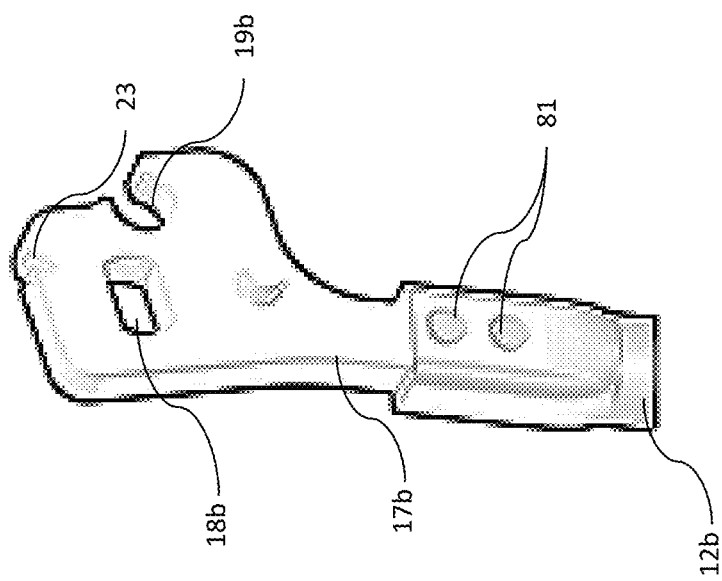
FIG. 13 is a detailed perspective view of the interface portion of the head restraint assembly according to another variant form thereof.

Turning now to FIG. 11, the present invention in an alternative configuration is identical to the exemplary embodiment already discussed except that the end of the C-spring 40 is engaged in a second cut-out in the pawl member 25. Thus, in this configuration, one end of the C-spring 40 is engaged by the second cut-out 30, and the other end of the C-spring 40 is engaged by the notch 23 of the interface 17a, to which the pawl member 25 is paired. The second cut-out 30 is positioned in the pawl member 25 such that, unless the pawl member 25 is acted on by an outside force sufficient to overcome the biasing force of the C-spring 40, the C-spring 40 always provides a biasing force that keeps the teeth 26 of the pawl member 25 engaged with the stationary teeth 22.

According to the alternative configuration, the head restraint assembly works as follows in operation: The user may move the bun assembly 15 in the first A direction, stopping at any of the plurality of predefined positions along the path of travel of the bun assembly 15. When a user wishes to move bun assembly 15 in the second B direction, the user may, with the bun assembly 15 in any given position, depress the "button" 73 of the actuator rod 70. This action drives the actuator rod 70 inwardly. In response to this inward movement, cam surface 72 acts against the complimentary surface of link notch 77 to drive the link member 71, against the biasing force of tension spring 76, toward the second, extended position D. The link member 71 then abuts the knockout 28 and drives the pawl member 25 from the first, engaged position to the second, disengaged position. Because the C-spring 40 is configured to always provide a biasing force that keeps the teeth 26 of the pawl member 25 engaged with the stationary teeth 22, the pawl member 25 remains disengaged from the stationary teeth 22 of the stationary toothed member 21 only so long as the user depresses the "button" 73. With the "button" 73 depressed, the user may again begin to move the bun assembly 15 in the second, rearward B direction to any desired position of the plurality of predefined positions along the path of travel of the bun assembly 15. When so positioned, the user may release the "button" 73 and thereby reengage the teeth 26 of the pawl member 25 with the stationary teeth 22.

As will be appreciated by those skilled in the art, the pawl member 25 may contain either the first cut-out 29 or the second cut-out 30 alone (not depicted), or both cut-outs 29, 30 simultaneously (see, e.g., FIGS. 4 through 8B). Where both first and second cut-outs 29, 30 are present, the C-spring 40 may be selectively engaged with either cut-out 29, 30 during manufacture/assembly, depending on the desired operation of the adjustment mechanism 20.

The illustrations herein for the first embodiment of the present invention have depicted the stationary toothed member 21, the link member 71, the guide 74, and the pawl member 25 located on the first bracket member 50a, and the "button" 73 located on the second bracket member 50b. Those skilled in the art, however, will recognize with the benefit of this disclosure that the configuration may be reversed. Additionally, the illustrations herein have depicted an adjustment mechanism 20 that includes only a single stationary toothed member 21, pawl member 25, link member 71, and guide 74. It is contemplated, however, that a stationary toothed member 21, pawl member 25, link member 71, and guide 74 may be simultaneously included on any and all bracket members present in the bun assembly, thereby increasing the load carrying capability of the design.

Turning now to FIGS. 14 to 24, the present invention according to a second exemplary embodiment is shown. Except as otherwise indicated below, the embodiment of FIGS. 14 to 24 is identical to the exemplary embodiment discussed above. In the embodiment of FIGS. 14 through 24, the adjustment mechanism 20 is now entirely on the same side of the bun assembly 15.

The adjustment mechanism 20 includes an actuator 90. A first end of the actuator 90 includes the "button" 73. A second end of the actuator 90 is rotatably and reciprocally moveably received through a key hole 91 in a cam member 92. The actuator 90 may contain a variable pitch surface 93 (best shown in FIGS. 23 and 24). The variable pitch surface 93 is useful for providing mechanical advantage to overcome frictional forces and effect rotation of the cam member 92, as will be explained more fully below. The actuator 90 may further include a flat surface 94 (best shown in FIGS. 23 and 24). The flat surface 94 serves to align the actuator 90 in a guideway defined in a stationary button housing 73a fixed to the bun core structure, which may comprise a molded plastic shell (for instance). The flat surface 94 also serves as a locator for a compression spring 95 located inside the "button" 73.

With continuing reference to FIGS. 14 to 24, the adjustment mechanism 20 further includes a ratchet member 121. The ratchet member 121 is shaped to define three projections 122, 123, 124, as shown. The ratchet member 121 further defines a plurality of ratchet teeth 125 designed for engagement with the teeth 26 of the pawl member 25. The ratchet member 121 is slidably movable over a backing plate 130. The backing plate 130 defines a channel 131, which retains the third ratchet projection 124 and provides a path along which the ratchet member 121 may slide.

Figure 17:
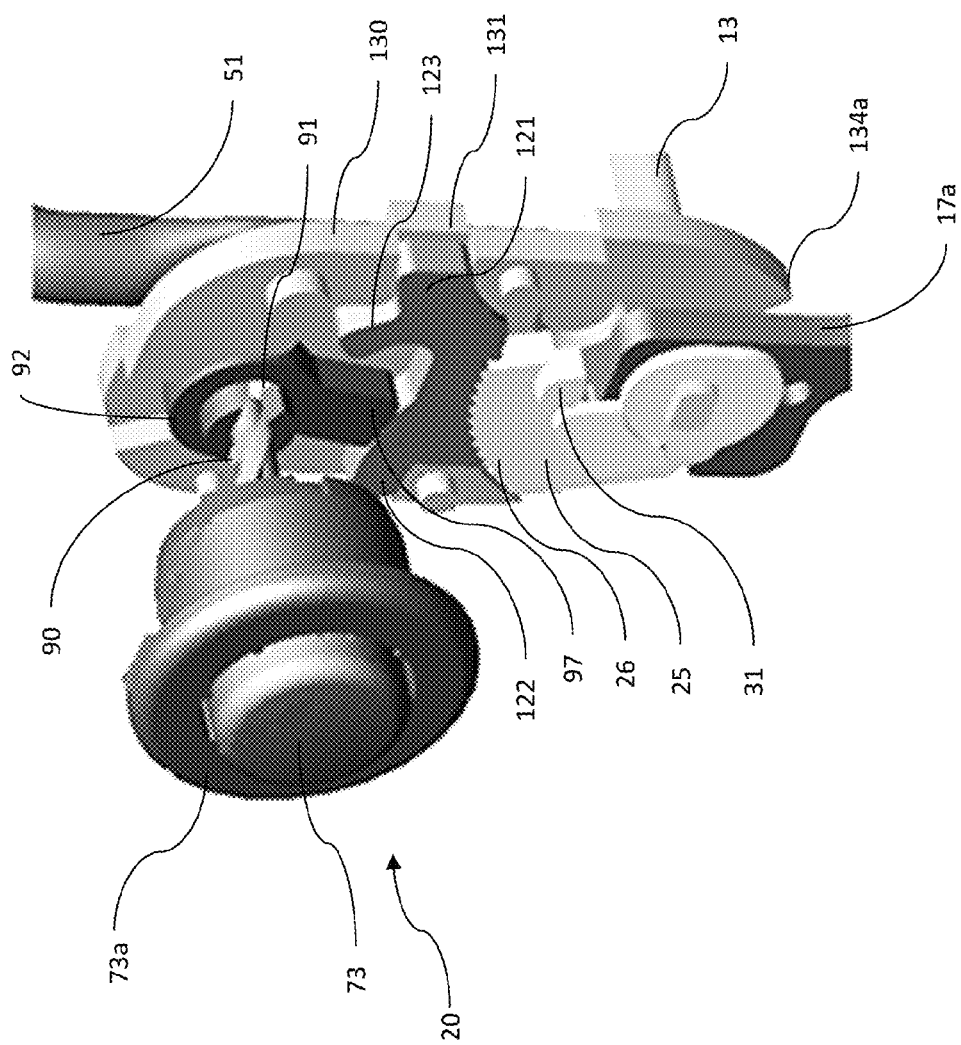
FIG. 17 is a detailed perspective view of the head restraint assembly of FIG. 14.
Figure 18:
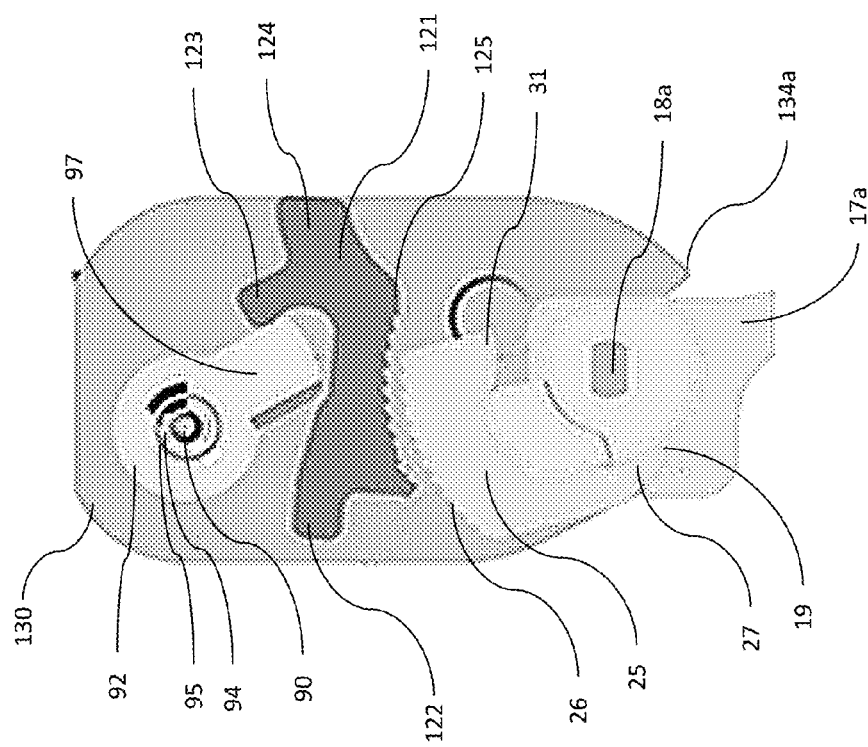
FIG. 18 is a detailed lateral view of the head restraint assembly of FIG. 14, with the pawl member shown in the disengaged position thereof.
Figure 19:
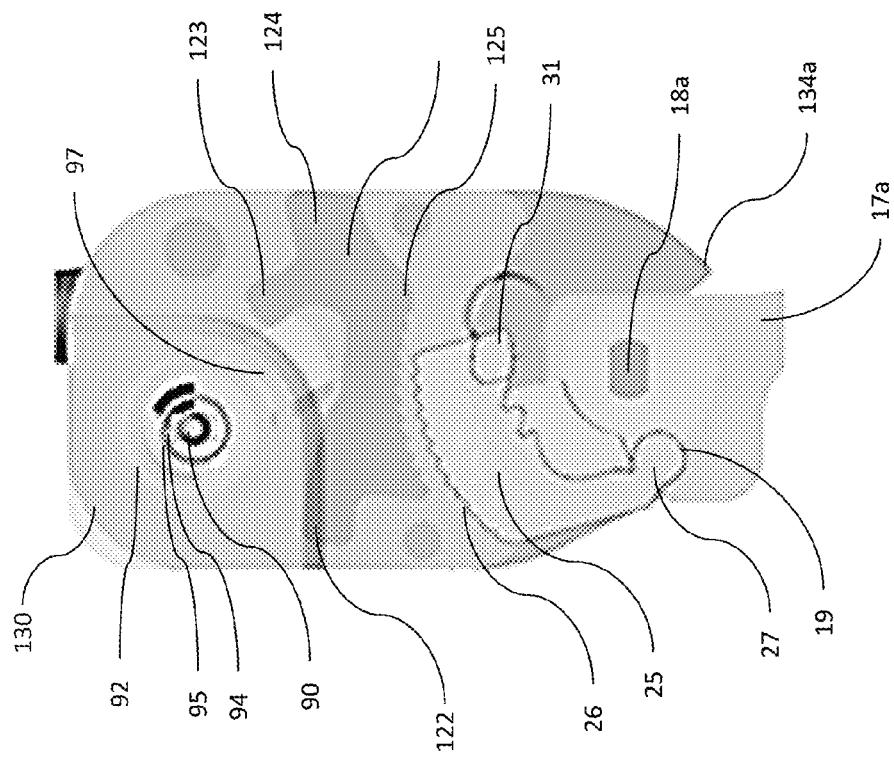
FIG. 19 is a detailed lateral view of the head restraint assembly of FIG. 14, with the pawl member shown in the disengaged position thereof.
Figure 20:
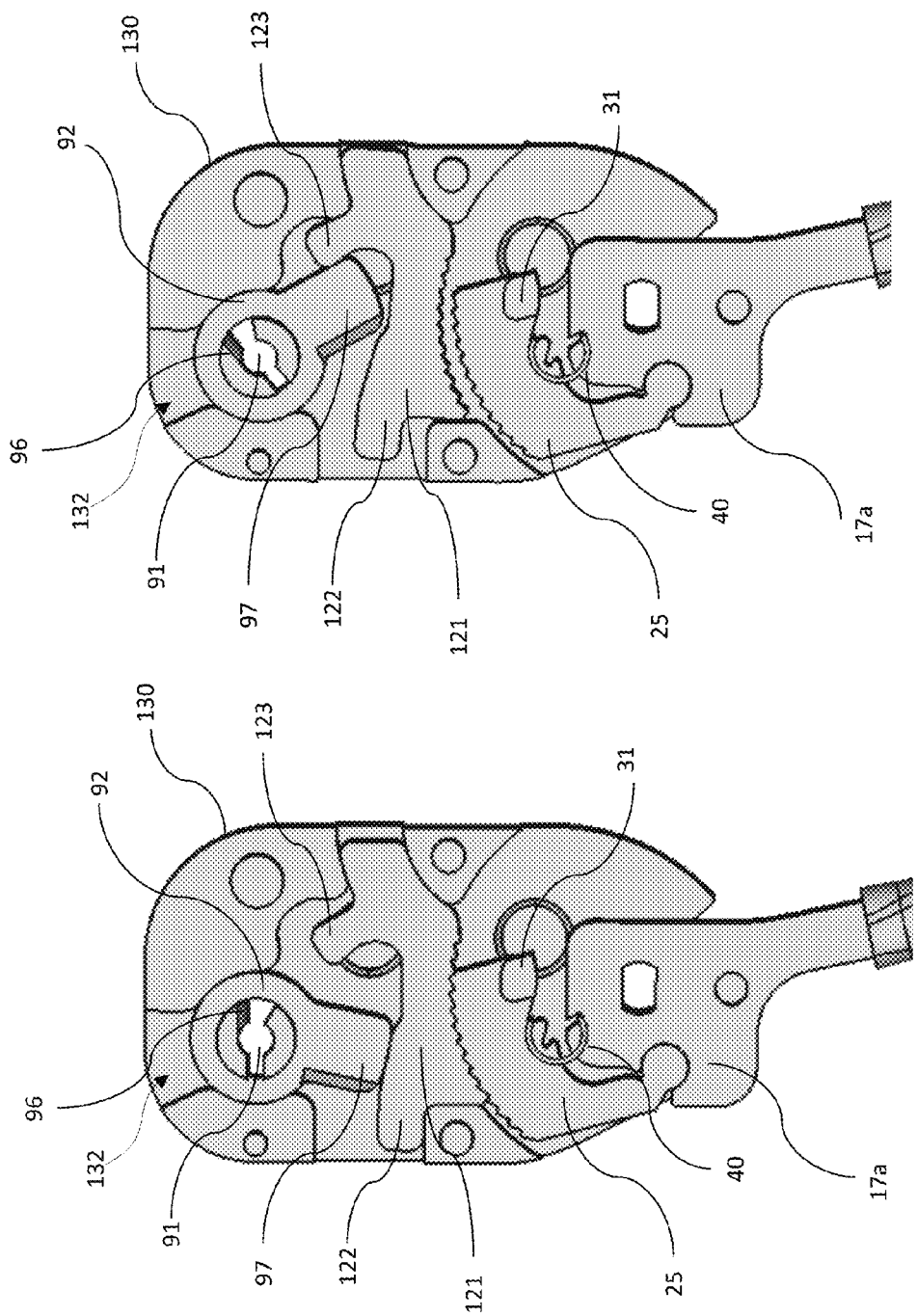
FIGS. 20A and 20B are detailed lateral views of the adjustment mechanism of the head restraint assembly of FIG. 14, shown partially disassembled for clarity, with the pawl member shown in an engaged position in FIG. 20A, and a disengaged position in FIG. 20B.

Referring to FIGS. 17 through 22, the cam member 92 is rotatably moveable about an axis defined by the actuator 90 between a first, locked position (FIGS. 17, 20A and 21), and a second, unlocked position (FIGS. 18, 19 and 20B). Further, movement of the cam member 92 between the first and second positions thereof is constrained by a channel 132 defined in the backing plate 130. In the first, locked position, a cam projection 97 on the cam member 92 abuts the first ratchet projection 122 of the ratchet member 121 to maintain engagement of the ratchet teeth 125 with the teeth 26 of the pawl member 25. As the cam member 92 rotates to the second, unlocked position, the cam projection 97 disengages with the first ratchet projection 122 and abuts the second ratchet projection 123. With continued rotation of the cam member 92 to the second, unlocked position, ratchet member 121 slides away from pawl member 25 by virtue of the cam projection 97 pushing on the second ratchet projection 123 and thus the ratchet teeth 125 disengage from the teeth 26 of the pawl member 25.

It will be appreciated by those skilled in the art that the actuator 90 according to the illustrated embodiment does not itself rotate but, rather, moves reciprocally in first and second directions along its longitudinal axis. During the course of this motion, the cam member 92 is thereby rotatably driven along the variable pitch surface 93.

Figure 14:
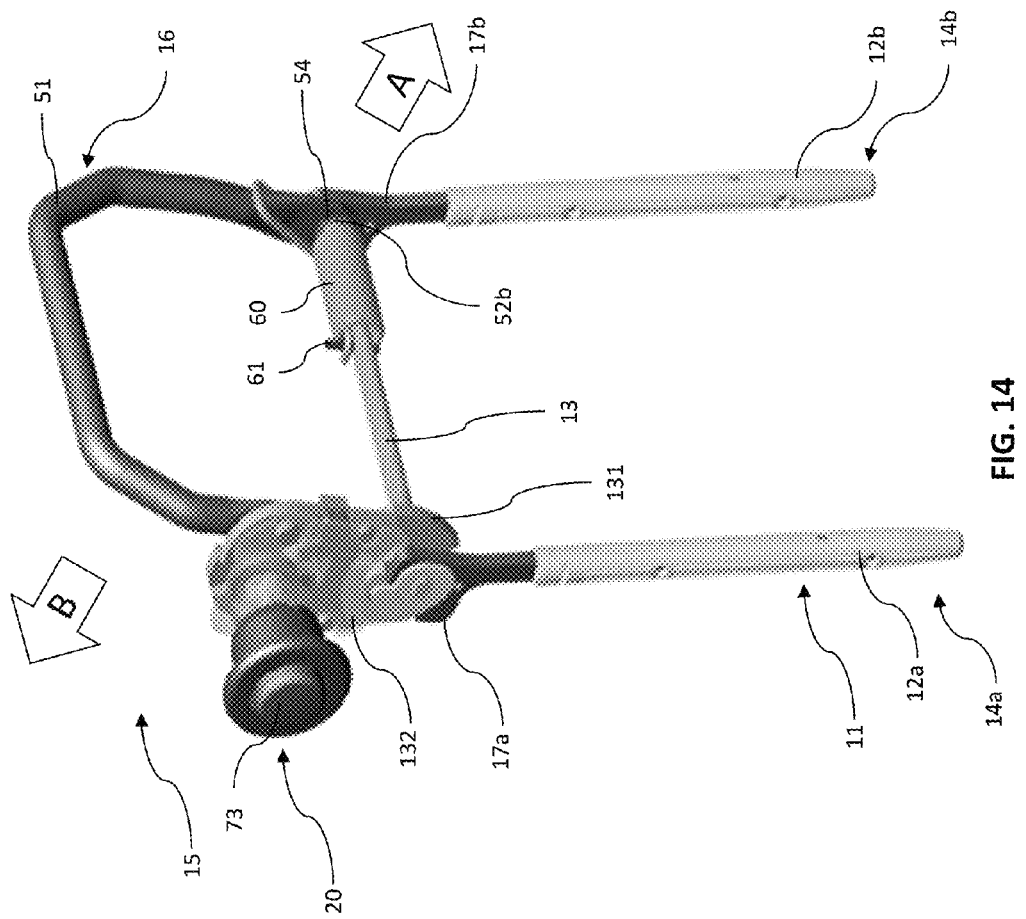
FIGS. 14 and 15 depict the present invention, shown in perspective, according to a second embodiment.
Figure 15:
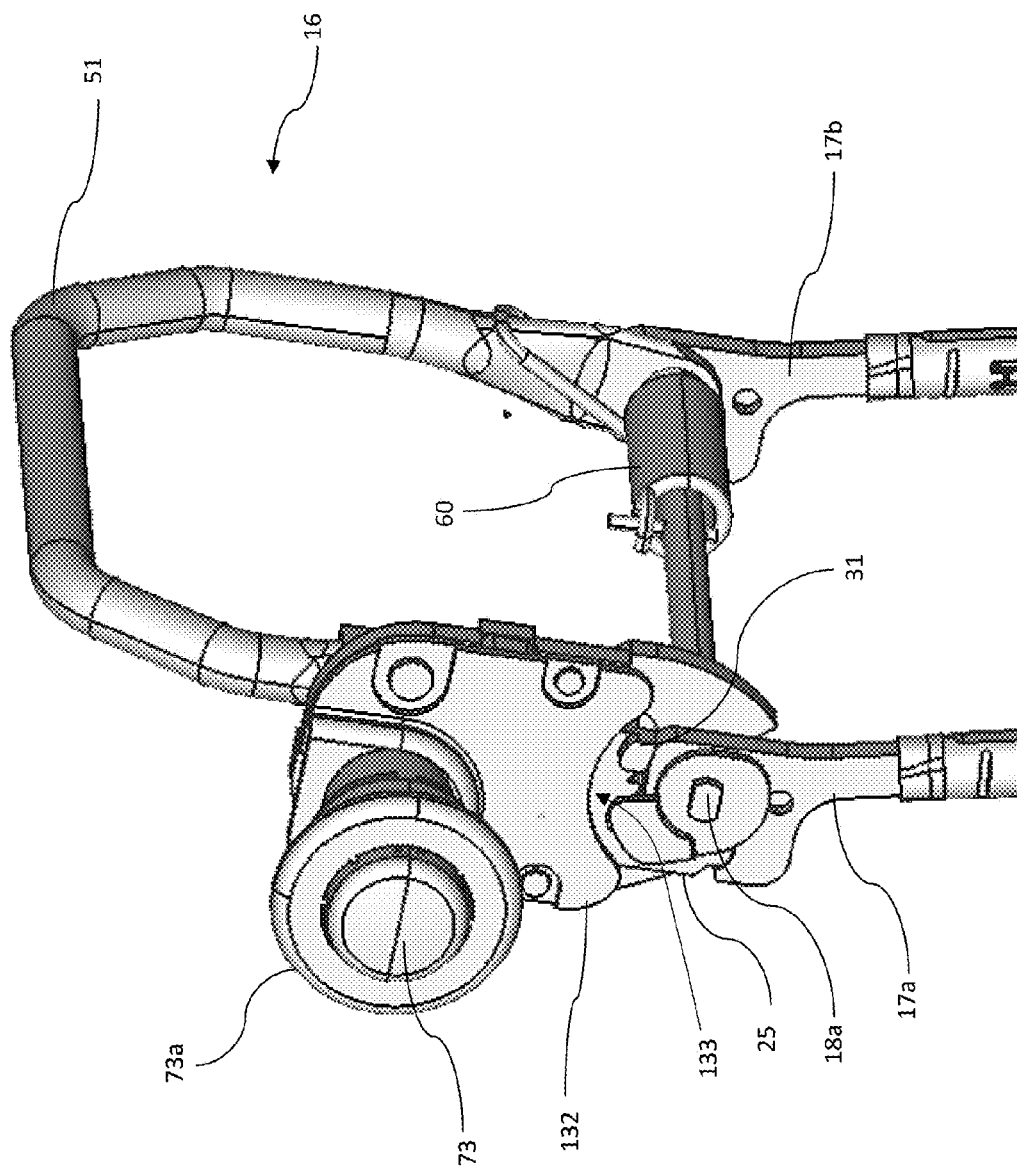
Figure 16:
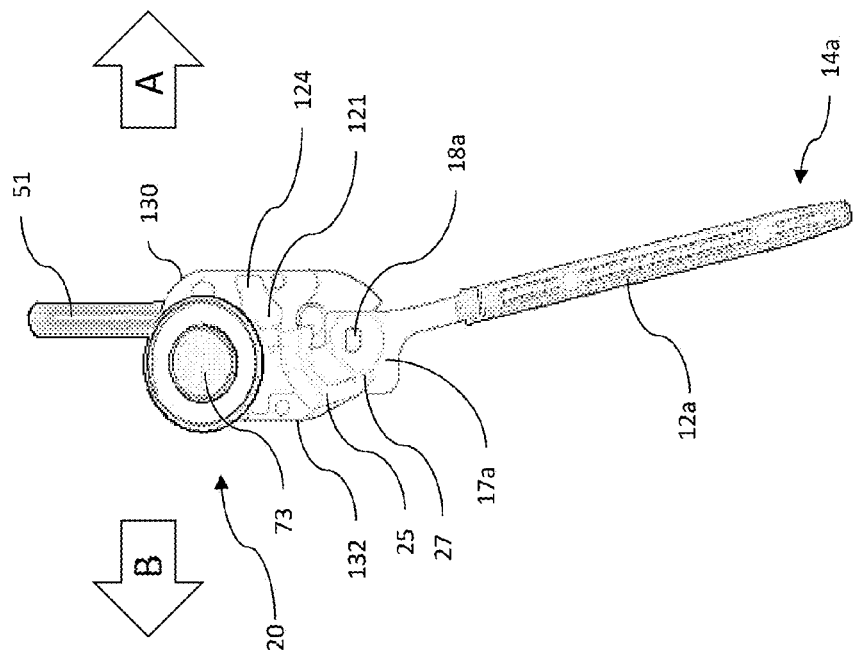
FIG. 16 is lateral view of the head restraint assembly of FIG. 14.

Turning now to FIGS. 14 through 16, the adjustment mechanism 20 may include a retainer plate 132 located between the "button" 73 and the internal workings of the adjustment mechanism 20, e.g., the pawl member 25, the ratchet member 121, and the cam member 92. The retainer plate 132 is fixedly attached to and works with the backing plate 130 to provide a housing for the internal workings of the adjustment mechanism 20. The retainer plate 132 may further include a trim edge 133.

With continuing reference to FIGS. 15 and 17 through 22, the pawl member 25 of this exemplary embodiment is identical to that of the first embodiment except that the pawl member 25 of this embodiment no longer includes the knockout 28. Rather, the pawl member 25 of this second exemplary embodiment includes an offset 31. When the ratchet teeth 125 are disengaged from the teeth 26 of the pawl member 25, the trim edge 133 of the retainer plate 132 interferes with the offset 31 of the pawl member 25 to keep the teeth 26 of the pawl member 25 disengaged from the ratchet member 121.

Figure 21:
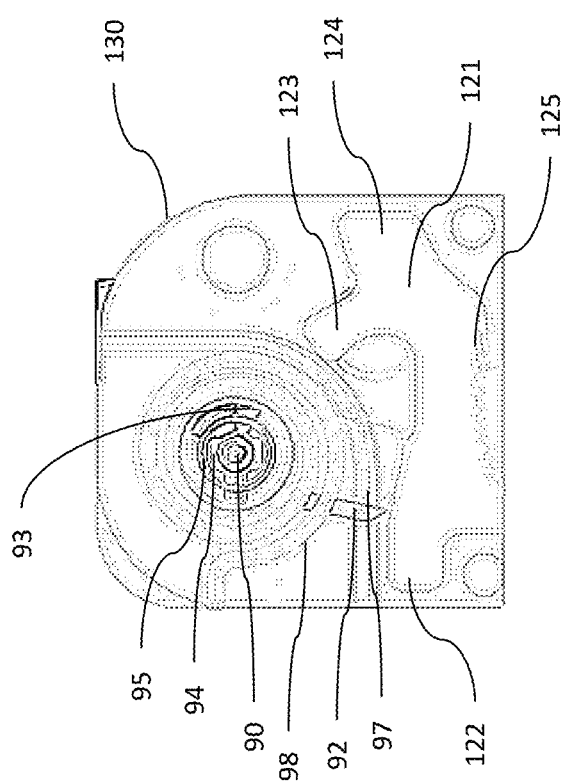
FIG. 21 is a detailed lateral view of the head restraint assembly of FIG. 14, with the pawl member shown in the engaged position thereof.

Referring now to FIG. 21, the adjustment mechanism 20 of this exemplary embodiment includes a second torsion spring 98. The second torsion spring 98 operates to return the cam member 92 to the first, locked position when the user releases the "button" 73.

As shown in FIG. 17, the adjustment mechanism 20 of this exemplary embodiment includes the C-spring 40, notch 23, and first and/or second cut-outs 29, 30, as previously described.

Figure 22:
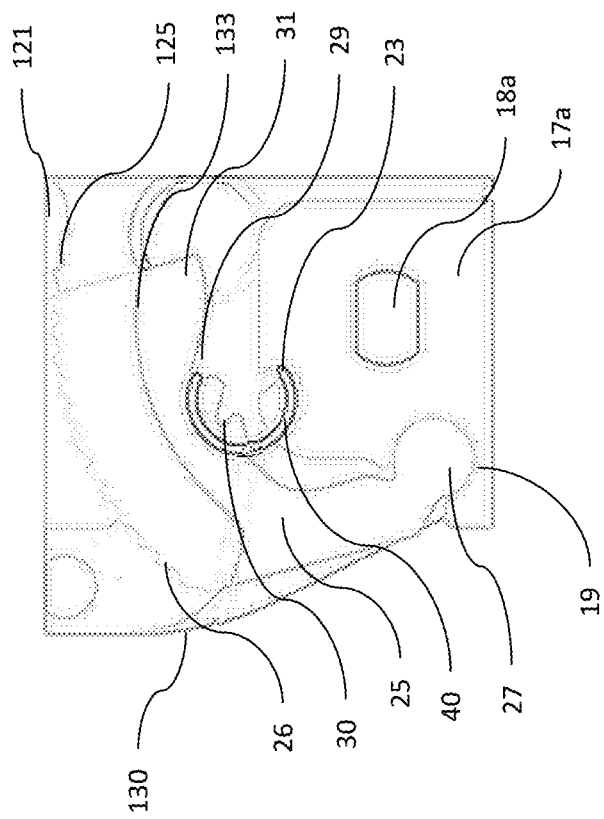
FIG. 22 is a detailed lateral view of the head restraint assembly of FIG. 14.
Figure 23:
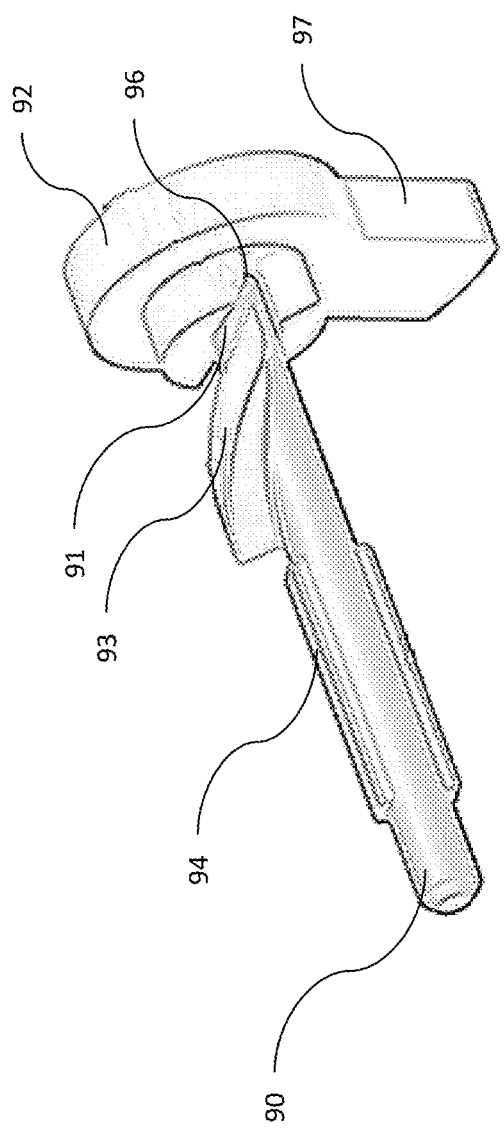
FIGS. 23 and 24 are perspective views of the actuator for the head restraint assembly of FIG. 14.
Figure 24:
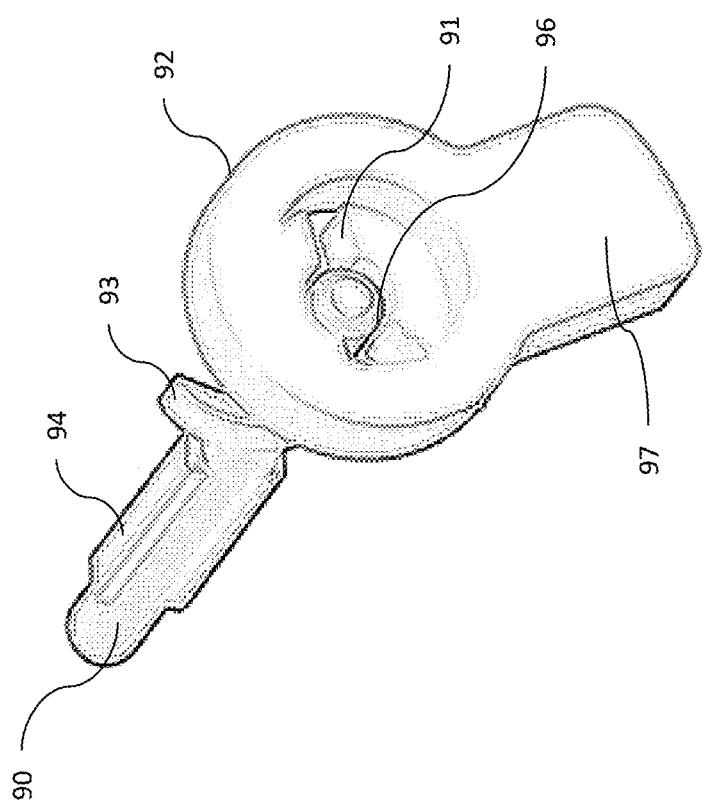

Turning to FIGS. 20A, 20B and 22, additional detail regarding the cam member 92 and the actuator 90 is shown. The key hole 91 of the cam member 92 includes a chamfer 96 which reduces the sliding resistance with the actuator 90. The cam member 92 also includes a guide hole, which keeps the actuator 90 centered during operation of the adjustment mechanism 20.

In this exemplary embodiment, the head restraint assembly works as follows in operation: The user may move the bun assembly 15 in the first, forward A direction, stopping at any of the plurality of predefined positions along the path of travel of the bun assembly 15. The bun assembly will be retained in the selected position by operation of the ratchet assembly as described. When a user wishes to move the bun assembly 15 in the second, rearward B direction, the user depresses the "button" 73 of the actuator 90. This action drives the actuator 90 inwardly. In response to this inward movement, the actuator 90 rotates the cam member 92 from the first, locked position to the second, unlocked position. As cam member 92 rotates to the unlocked position, the cam projection 97 abuts the second projection 123 of the ratchet member 121. In response to this abutment, the ratchet member 121 slides away from pawl member 25 and thus the ratchet teeth 125 disengage from the teeth 26 of the pawl member 25. With the ratchet teeth 125 disengaged, the user may begin to move the bun assembly 15 in the second B direction to any desired position. During this movement in the second B direction, the trim edge 133 of the retainer plate 132 prevents the teeth 26 of the pawl member 25 from engaging the ratchet teeth 125 of the ratchet member 121. When positioned according to the user's preference, the user releases the "button" 73. Upon releasing the "button" 73, the second torsion spring 98 rotates the cam member 92 back to the first, locked position. As the cam member 92 rotates to the first, locked position, the cam projection 97 abuts the first projection 122 of the ratchet member 121, which slides the ratchet member 121 toward the pawl member 25 such that the ratchet teeth 125 reengage with the teeth 26 of the pawl member 25. At this point, a user may once again freely move the bun assembly 15 in the first, forward A direction stopping at any of the plurality of predefined positions along the path of travel of the bun assembly 15. With the ratchet teeth 125 engaged with the teeth 26 of the pawl member 25, however, movement in the second, rearward B direction will be restrained until the user once again depresses the "button" 73.

Figure 25:
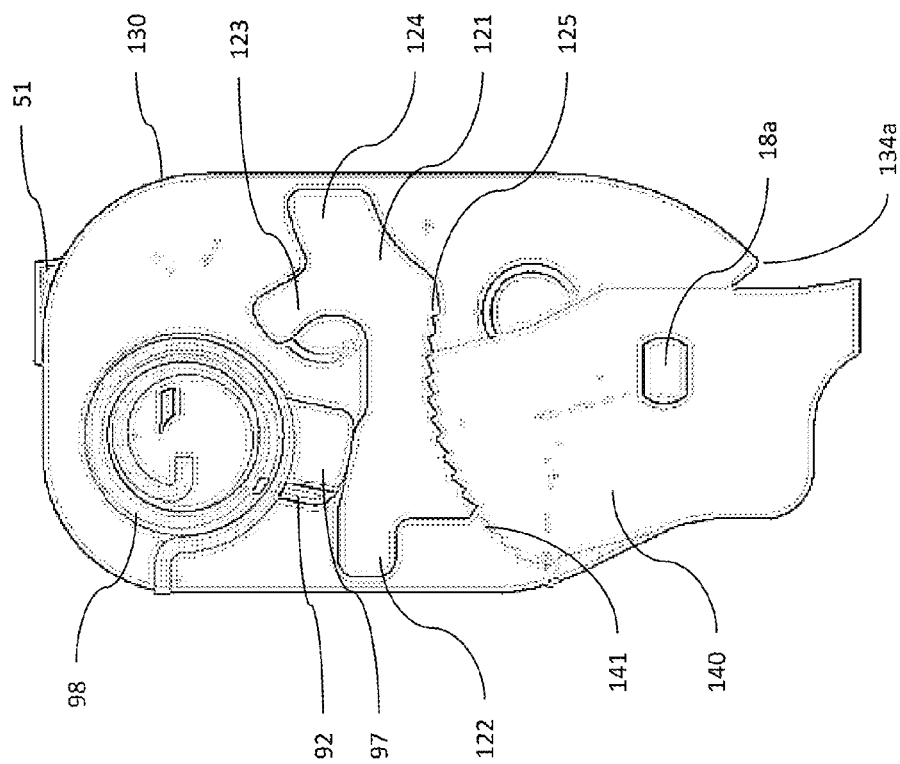
FIG. 25 depicts the present invention according to a third embodiment.

Turning now to FIG. 25, the present invention according to a third exemplary embodiment is identical to the second exemplary embodiment already discussed except as noted below. First, the pawl member 25 and the interface 17a of the previous embodiment are replaced with a monolithic, immovable toothed component 140. The immovable toothed component 140 does not pivot like the pawl member 25. Rather, the immovable toothed component 140 is fixed to the vertical support 12a. The toothed component 140 includes fixed teeth 141 designed to engage the teeth 125 of the ratchet 121 in the manner described below. Thus, the third embodiment does not, strictly speaking, constitute a ratchet. The immovable toothed component 140 and locking "ratchet" 121 eliminate the ability of the user to freely move the bun assembly 15 in the first, forward A direction without depressing the "button" 73. Rather, in this third exemplary embodiment, the adjustment mechanism 20 locks the movement of the bun assembly 15 in both the first A and second B directions while the cam member 92 is in the locked position thereof.

In this third exemplary embodiment, the head restraint assembly works as follows in operation: When a user wishes to move the bun assembly 15 in either the first, forward A direction or the second, rearward B direction, the user depresses the "button" 73 of the actuator 90. This action drives the actuator 90 inwardly. In response to this inward movement, the actuator 90 rotates the cam member 92 from the first, locked position to the second, unlocked position. As cam member 92 rotates to the second, unlocked position, the cam projection 97 abuts the second projection 123 of the ratchet member 121. In response to this abutment, ratchet member 121 slides away from the immovable toothed component 140 and thus the teeth 125 disengage from the teeth 141 of the immovable toothed component 140. With the teeth 125 disengaged, the user may begin to move the bun assembly 15 in either the first A or second B directions to any desired position. When positioned according to the user's preference, the user releases the "button" 73. Upon releasing the "button" 73, the second torsion spring 98 rotates the cam member 92 back to the first, locked position. As the cam member 92 rotates to the first, locked position, the cam projection 97 abuts the first projection 122 of the ratchet member 121, which slides the ratchet member 121 toward the immovable toothed component 140 such that the teeth 125 reengage with the immovable teeth 141 of the immovable toothed component 140. At this point, the bun assembly 15 is restrained from movement in both the first, forward A direction and the second, rearward B direction until the user depresses "button" 73 again.

As will be appreciated, the teeth 125 and 141 of this embodiment are preferably, though not necessarily, not profiled in an inclined geometry characteristic of ratchet teeth designed to slide more readily relative to each other in a first direction. Rather, teeth 125 and 141 are each more symmetrical in profile, thereby better facilitating secure engagement thereof through resistance to movement in either of the first A and second B directions equally.

Figure 26:
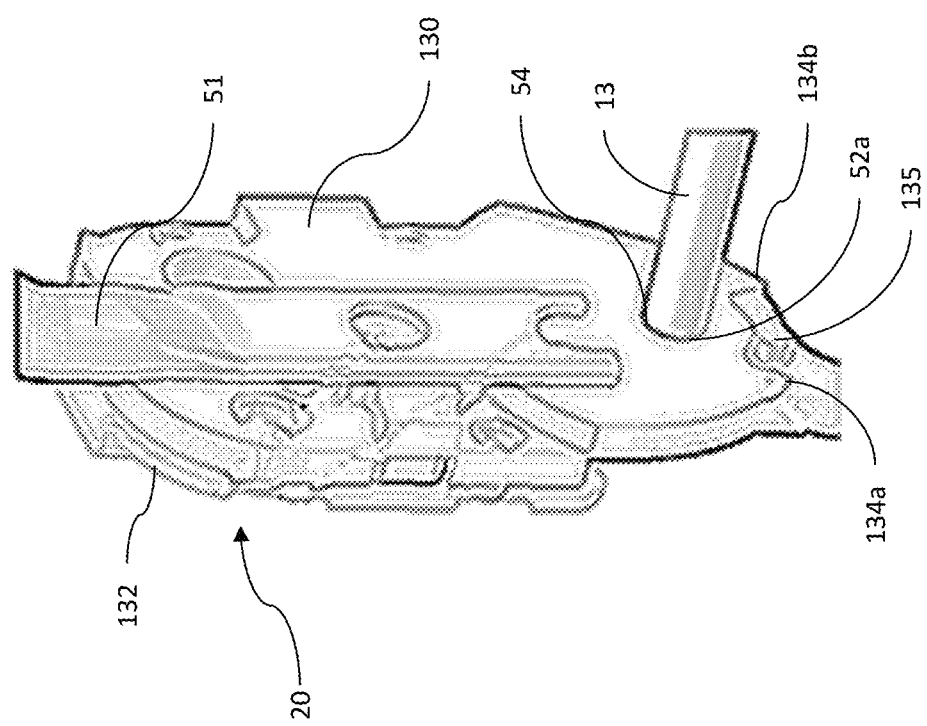
FIG. 26 is perspective view of the head restraint assembly according to one alternative construction thereof.

Turning now to FIG. 26, the present invention according to any preceding embodiment may be modified so that the first bracket member 50a is removed and the cross-bar 51 plug welded directly to the backing plate 130. Per this modification, the backing plate 130 comprises a monolithic element defining a circular opening 52a, the inner diameter of which is shaped to conform to the outer diameter of the horizontal support 13. A bushing 54 may be installed between the circular opening 52a and the horizontal support 13. The backing plate 130 is pivotally mounted substantially on an end of the horizontal support 13 to permit selective movement of the head restraint assembly in the manner previously described.

The backing plate 130 may further include stops 134a, 134b. The stops 134a, 134b interfere with a post 135 incorporated in the interface 17a or the immovable toothed component, whichever is present, to provide a limit on the range of motion of the bun assembly 15. Those skilled in the art will recognize that, although not depicted, stops similarly may be incorporated into the bracket members 50a, 50b.

Figure 27:
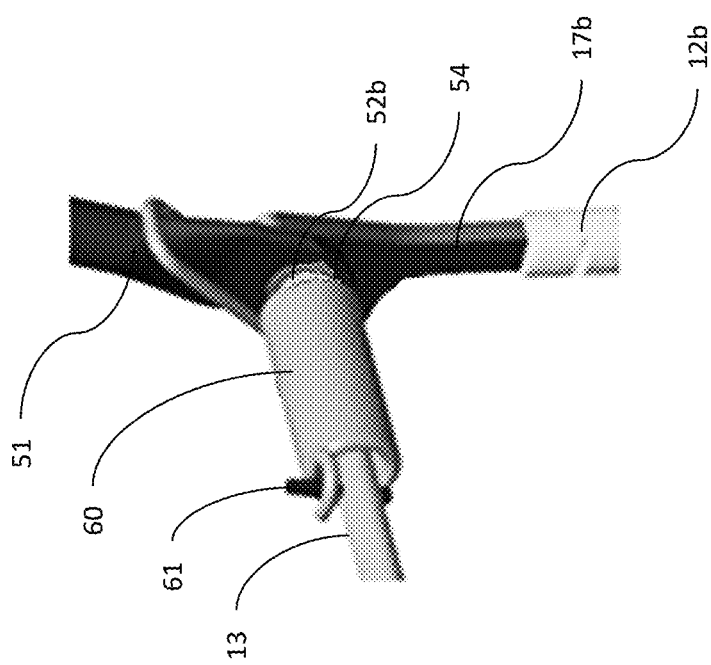
FIG. 27 is a detailed perspective view of the head restraint assembly according to one alternative construction thereof.

Referring now to FIG. 27, the present invention according to any preceding embodiment may be modified so that the second bracket member 50b is removed and the cross-bar 51 extended down to interact directly with the horizontal support 13. Per this modification, the cross-bar 51 defines a circular opening 52b, the inner diameter of which is shaped to conform to the outer diameter of the horizontal support 13. A bushing 54 may be installed between the circular opening 52b and the horizontal support 13. The cross-bar 51 is pivotally mounted substantially on an end of the horizontal support 13 to permit selective movement of the head restraint assembly in the manner previously described.

For any of the foregoing embodiments, where the button is shown as being secured to the adjustment mechanism, it should be understood that this arrangement is preferably (though not exclusively) employed where, instead of a plastic core structure surrounding the adjustment mechanism, a component molded from expanded polypropylene (EPP) foam is secured (for instance, with adhesive) to the headrest crossbar 51. In other instances, such as where a rigid plastic core structure is used, it is preferable (though, again, not necessary), that the button is secured to such core structure.

It should be understood that the button may be secured to the core structure of the bun where a core structure is employed in the head restraint assembly to surround the adjustment mechanism.

The above description is of preferred embodiments. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The invention in which an exclusive property or privilege is claimed is defined as follows:

1. A head restraint assembly, comprising:
    a head restraint support configured to mount the head restraint above a seat back;
    a bun assembly pivotally mounted on the head restraint support for movement in first and second directions relative to the head restraint support, the limit of the first and second directions of movement defining fully forward and fully upright positions, respectively, of the bun assembly; and
    an adjustment mechanism disposed at least substantially within the bun assembly, the adjustment mechanism configured to permit the pivotal movement of the bun assembly in either of the first and second directions;
    wherein the bun assembly comprises a frame assembly, and the adjustment mechanism comprises:
        a fixed toothed member disposed on the frame assembly, the fixed tooth member including a plurality of teeth arranged to define a plurality of predefined positions of the bun assembly along the path of travel in the first and second directions thereof;
a toothed pawl member moveable between an engaged position, in which the teeth of the pawl member are engaged with the teeth of the fixed tooth member, and a disengaged position, in which the teeth of the pawl member are disengaged from the teeth of the fixed tooth member; and
a biasing element, the biasing element providing a biasing force that keeps the toothed pawl member in the engaged position when the toothed pawl member is in the engaged position, and the biasing element providing a biasing force that keeps the toothed pawl member in the disengaged position when the toothed pawl member is in the disengaged position.

2. The head restraint assembly of claim 1, wherein the toothed pawl member is a monolithic element including a pivot portion received within an interface of the head restraint support, and wherein the toothed pawl member and interface are shaped so that the toothed pawl member is moveable about the pivot portion between the engaged and disengaged positions.

3. The head restraint assembly of claim 1, wherein, in the condition where the bun assembly is moved in the second direction to the fully upright position thereof when the toothed pawl member is in the disengaged position thereof, the bun assembly contacts the toothed pawl member to urge the toothed pawl member into the engaged position.

4. The head restraint assembly of claim 1, wherein the adjustment mechanism further comprises a manually-operative actuator configured to move the toothed pawl member from the engaged position into the disengaged position.

5. The head restraint assembly of claim 1, wherein the bun assembly is biased to the fully upright position.

6. A head restraint assembly, comprising:
a head restraint support configured to mount the head restraint above a seat back;
a bun assembly including a frame assembly, the bun assembly pivotally mounted on the head restraint support for movement in first and second directions relative to the head restraint support, the limit of the first and second directions of movement defining fully forward and fully upright positions, respectively, of the bun assembly; and
an adjustment mechanism disposed at least substantially within the bun assembly, the adjustment mechanism configured to permit the pivotal movement of the bun assembly in either of the first and second directions, wherein the adjustment mechanism comprises:
a pawl member disposed on the frame assembly, the pawl member including a plurality of teeth arranged to define a plurality of predefined positions of the bun assembly along the path of travel in the first and second directions thereof;
a ratchet member disposed on the frame assembly, the ratchet member moveable between an engaged position, in which the teeth of the ratchet member are engaged with the teeth of the pawl member, and a disengaged position, in which the teeth of the ratchet member are disengaged from the teeth of the pawl member; and
a manually-operative actuator including a cam member rotatable between locked and unlocked positions upon manual operation of the actuator, wherein the cam member in moving to the unlocked position thereof moves the ratchet member to the disengaged position thereof, and the cam member in moving to the locked position thereof moves the ratchet member to the engaged position thereof.

7. A head restraint assembly, comprising:
a head restraint support configured to mount the head restraint above a seat back;
a bun assembly including a frame assembly, the bun assembly pivotally mounted on the head restraint support for movement in first and second directions relative to the head restraint support, the limit of the first and second directions of movement defining fully forward and fully upright positions, respectively, of the bun assembly; and
an adjustment mechanism disposed at least substantially within the bun assembly, the adjustment mechanism configured to permit the pivotal movement of the bun assembly in either of the first and second directions, and the adjustment mechanism including:
a fixed toothed member disposed on the frame assembly, the fixed tooth member including a plurality of teeth arranged to define a plurality of predefined positions of the bun assembly along the path of travel in the first and second directions thereof; and
a toothed pawl member moveable between an engaged position, in which the teeth of the pawl member are engaged with the teeth of the fixed tooth member, and a disengaged position, in which the teeth of the pawl member are disengaged from the teeth of the fixed tooth member;
wherein the toothed pawl member is a monolithic element including a pivot portion received within an interface of the head restraint support, and wherein the toothed pawl member and interface are shaped so that the toothed pawl member is moveable about the pivot portion between the engaged and disengaged positions.

8. The head restraint assembly of claim 7, wherein the adjustment mechanism includes a biasing element providing a biasing force that keeps the toothed pawl member in the engaged position, and a manually-operative actuator configured to overcome the biasing force of the biasing element and move the toothed pawl member from the engaged position into the disengaged position so long as the actuator is actuated.

9. A head restraint assembly, comprising:
a head restraint support configured to mount the head restraint above a seat back;
a bun assembly including a frame assembly, the bun assembly pivotally mounted on the head restraint support for movement in first and second directions relative to the head restraint support, the limit of the first and second directions of movement defining fully forward and fully upright positions, respectively, of the bun assembly; and
an adjustment mechanism disposed at least substantially within the bun assembly, the adjustment mechanism configured to permit the pivotal movement of the bun assembly in either of the first and second directions, and the adjustment mechanism including:
a fixed toothed member disposed on the frame assembly, the fixed tooth member including a plurality of teeth arranged to define a plurality of predefined positions of the bun assembly along the path of travel in the first and second directions thereof; and
a toothed pawl member moveable between an engaged position, in which the teeth of the pawl member are engaged with the teeth of the fixed tooth member, and a disengaged position, in which the teeth of the pawl member are disengaged from the teeth of the fixed tooth member;

wherein, in the condition where the bun assembly is moved in the second direction to the fully upright position thereof when the toothed pawl member is in the disengaged position thereof, the bun assembly contacts the toothed pawl member to urge the toothed pawl member into the engaged position.

* * * * *